United States Patent [19]

Pennington et al.

[11] Patent Number: 4,665,140

[45] Date of Patent: May 12, 1987

[54] PROCESS FOR POLYMERIZING A MONOMER CHARGE

[75] Inventors: B. Timothy Pennington, Sulphur, La.; Paul V. Roling, Spring, Tex.; John T. T. Hsieh, Warren, N.J.

[73] Assignee: Cities Service Oil & Gas Corp., Tulsa, Okla.

[21] Appl. No.: 715,271

[22] Filed: Mar. 25, 1985

Related U.S. Application Data

[60] Continuation-in-part of Ser. No. 566,544, Dec. 29, 1983, abandoned, which is a division of Ser. No. 444,287, Nov. 24, 1982, Pat. No. 4,435,518.

[51] Int. Cl.$^4$ ............................ C08F 2/34; C08F 10/02
[52] U.S. Cl. .......................................... 526/86; 526/87; 526/88; 526/124; 526/129; 526/142; 526/901
[58] Field of Search ...................... 526/88, 87, 97, 121, 526/124, 129, 142, 86

[56] References Cited

U.S. PATENT DOCUMENTS

| | | | |
|---|---|---|---|
| 2,965,626 | 12/1960 | Pilar et al. | 526/142 |
| 3,163,611 | 12/1964 | Andersen et al. | 526/142 |
| 3,202,645 | 8/1965 | Yancey | 526/97 |
| 3,718,636 | 2/1973 | Stevens et al. | 526/97 |
| 3,787,384 | 1/1974 | Stevens et al. | 526/129 |
| 3,790,550 | 2/1974 | Miller | 526/901 |
| 3,925,338 | 12/1975 | Ort | 526/97 |
| 3,956,255 | 5/1976 | Ort | 526/129 |
| 4,232,140 | 11/1980 | Ort | 526/124 |
| 4,256,865 | 3/1981 | Hyde et al. | 526/125 |
| 4,383,095 | 5/1983 | Goeke et al. | 526/88 |
| 4,435,518 | 3/1984 | Pennington et al. | 526/129 |

FOREIGN PATENT DOCUMENTS

| | | |
|---|---|---|
| 1276345 | 6/1972 | United Kingdom . |
| 1287396 | 8/1972 | United Kingdom . |

*Primary Examiner*—Edward J. Smith
*Attorney, Agent, or Firm*—John Wade Carpenter

[57] ABSTRACT

Process of polymerizing a monomer charge including ethylene by (1) drying an inorganic oxide having surface hydroxyl groups to form a support that is substantially free of adsorbed water, (2) reacting the surface hydroxyl groups of the support with at least a substantially stoichiometric amount of at least one organometallic compound corresponding to the formula $R_xMR'_yR''_z$, wherein M is a metal of Group III of the periodic table, R is an alkyl group containing 1 to 12 carbon atoms, R' and R'' are independently selected from the group consisting of H, Cl, and alkyl and alkoxy groups containing 1 to 12 carbon atoms, x has a value of 1 to 3, and y and z both represent values of 0 to 2, the sum of which is not greater than $3-x$, (3) reacting the thus-treated support with at least about 0.001 mol, per mol of organometallic compound, of at least one vanadium compound corresponding to a formula selected from $(RO)_nVOX_{3-n}$ and $(RO)_mVX_{4-m}$, in which formulas R represents a $C_1$–$C_{18}$ monovalent hydrocarbon radical that is free of aliphatic unsaturation, X is Cl or Br, n has a value of 0 to 3, and m has a value of 0 to 4, (4) reacting the product of step 3 with at least about 0.1 mol, per mol of organometallic compound, of an alcohol containing 1 to 18 carbon atoms, (5) feeding the product into a gas-phase reaction zone, (6) feeding a trialkylaluminum into the gas-phase reaction zone in order to form a bed comprising the product and the trialkylaluminum, (7) fluidizing the bed with a gas mixture including ethylene, hydrogen and chloroform, (8) removing particulate polymerized substantially ethylene particles from the reaction zone, and (9) recycling unreacted gas mixture from the top of the reaction zone to the bottom of the reaction zone.

28 Claims, No Drawings

PROCESS FOR POLYMERIZING A MONOMER CHARGE

BACKGROUND OF THE INVENTION

This is a continuation-in-part application of our co-pending application filed on Dec. 29, 1983 and having Ser. No. 566,544, now abandoned. Our co-pending application was a divisional application of an application which had Ser. No. 444,287 and a filing date of Nov. 24, 1982 and now U.S. Pat. No. 4,435,518.

FIELD OF THE INVENTION

This invention relates to the polymerization of olefins. More particularly, this invention relates to a process having catalyst compositions which are useful for polymerizing one or more monomers comprising ethylene to polymers having a narrow molecular weight distribution and a good balance of physical properties.

DESCRIPTION OF THE PRIOR ART

It is known that catalysts of the type variously described as coordination, Ziegler, Ziegler-type, or Ziegler-Natta catalysts are useful for the polymerization of olefins under moderate conditions of temperature and pressure. It is also known that the properties of the polymers obtainable by the use of such catalysts, as well as the relative economies of the processes used to prepare the polymers, vary with several factors, including the choice of the particular monomers, catalyst components, polymerization adjuvants, and other polymerization conditions employed.

During the years since Ziegler catalysts were first publicly disclosed, there has been a considerable amount of research conducted on the use of such catalysts; and numerous publications have resulted from that research. These publications have added much to the knowledge of how to make various types of olefin polymers by various types of processes. However, as is apparent from the amount of research on Ziegler catalysis that is still being conducted throughout the world, as well as the number of patents that are still being issued to inventors working in the field of Ziegler catalysis, the means of attaining certain results when polymerizing olefins with Ziegler catalysts are still frequently unpredictable. The fact that this situation exists is sometimes due to the need to obtain a previously-unattainable combination of results; occasionally due to difficulties in obtaining the same results in a commercial-scale apparatus as in a laboratory-scale reactor; and often due to a polymerization parameter's having an effect, or side-effect, in a given type of polymerization process that is different from effects achieved by its use in prior art processes of a different type.

One aspect of Ziegler catalysis in which the need for further research has been found to exist has been in the provision of catalyst compositions suitable for use in a commercially-feasible process for preparing ethylene polymers having a narrow molecular weight distribution and a good balance of physical properties. Such polymers have particular application in the production of articles that are formed by injection molding; typically have molecular weight distributions such that their normalized $V_{30}/V_{300}$ melt viscosity ratios are in the range of about 1.5 to 2.3, with the ratios in the lower portion of this range being generally preferred but difficult to attain with known processes that might otherwise be commercially feasible; and—like other polymers intended for commercial use—are desirably prepared by a process which is as economical as possible as well as being capable of producing a polymer having the desired properties.

There are, of course, known processes for preparing injection molding resins by polymerizing ethylene with the aid of Ziegler catalysts. However, the known processes typically suffer one or more of the disadvantages of lack of economy, inability to produce polymers having a suitable balance of properties, and/or unreliability in producing such polymers—particularly in commercial-scale operations.

U.S. Pat. No. 4,003,712 by Miller teaches a gas-phase fluidized bed system and process which are capable of being scaled up to commercial size and, being solvent-free, would be less expensive than processes which use solvents or liquid diluents. However, Miller's silyl chromate catalyst does not give polymers of the desired molecular weight distribution and good balance of physical properties. His system contains some features which tend to shorten commercial "on-stream" time. He does not teach how to avoid polymer buildup on reactor surfaces, a phenomenon variously referred to as "coating", "fouling", or "sheeting".

What is still needed is a process employing a catalyst which (a) is suitable for use in a gas-phase polymerization process, (b) is capable of yielding polymers having a narrow molecular weight distribution and a good balance of physical properties, (c) has sufficient activity to be economically attractive, (d) does not cause reactor wall fouling, and (e) a gas-phase fluidized bed process which allows the catalyst to perform at its full potential at commercial scale.

British Pat. No. 1,489,410 (Monsanto) teaches gas-phase polymerization processes which, because of their use of supported Ziegler catalysts having a vanadium component and other factors, are commercially attractive processes. However, as taught in the patent, the processes are designed to result in the formation of polymers having the broad molecular weight distributions suitable for blow molding resins rather than the narrower molecular weight distributions needed for injection molding resins; and the patent itself does not suggest how its processes might be modified to result in the formation of polymers having narrower molecular weight distributions. Attempts to make the processes of the Monsanto patent suitable for the preparation of injection molding resins by combining its teachings with the teachings of publications that discuss means of narrowing molecular weight distribution have not been successful. For example, polymers having a sufficiently narrow molecular weight distribution have not been obtained when Monsanto's preferred vanadium halides have been replaced with the alkoxy group-containing vanadium compounds which are within the scope of their patent and which U.S. Pat. Nos. 3,457,244 (Fukuda et al.) and 3,655,583 (Yamamoto et al.) teach to result in the production of polymers having narrower molecular weight distributions when unsupported catalyst systems are employed.

U.S. Pat. No. 2,965,626 by Pilar et al discloses polymerizing organic compounds containing ethylenic unsaturation under relatively mild polymerization conditions with catalysts and alcohol catalyst promoters. More specifically Pilar et al found that the polymerization activity of the catalyst prepared by reaction of alkali reagents with the specified metal salts can be substantially increased by the inclusion of an alcohol in the reaction zone. U.S. Pat. No. 3,163,611 by Andersen et al pertains to the production of high density polyethylene by polymerizing ethylene in the presence of a catalyst exemplified by the material obtained by the interaction of a trialkylaluminum with titanium tetrachloride.

U.S. Pat. No. 3,202,645 to Yancey presents a process for polymerizing and copolymerizing alpha mono and di-olefins by catalysts comprising (a) the product of the reaction between a compound of a metal chosen from the group consisting of the metals of Group IIb and IIIb (where the group numbers correspond to the Mendeleev Periodic Table) and hydroxyl groups on the surface of a finely-divided particulate inorganic solid, preferably finely-divided silica or alumina, and (b) a halide-type compound of a Group IVa, V, VIa, VIIa, or period 4 of Group VIII metal. The polymerization or copolymerization reaction can be effected at suitable temperatures within the range of from about $-25°$ C. to about $250°$ C., and pressures ranging from below atmospheric upwardly to any desired maximum pressure, for example, 30,000 p.s.i.g. or even higher pressures. U.S. Pat. No. 3,718,636 to Stevens et al teaches obtaining polyolefins having a wide distribution of molecular weights through the use of a catalyst comprising an organometallic compound, and a solid complex component obtained by reacting a solid bivalent metal compound with an impregnation agent which consists of an organometallic compound, separating the solid reaction product, and reacting the solid reaction product with a halogenated derivative of a transition metal. Stevens et al teaches in U.S. Pat. No. 3,787,384 another catalyst suitable for use in olefin polymerization and olefin copolymerization which comprises (a) at least one organometallic compound, and (b) a solid catalytic component obtained by reacting a support composed of silica, alumina or both silica and alumina with a compound of the formula $MR_nX_{m-n}$ in which M is aluminum or magnesium, R is a hydrocarbon radical containing 1 to 20 carbon atoms, X is hydrogen or a halogen, m is the valence of M, and n is a whole number not less than 1 nor greater than m, separating the solid product of the reaction, reacting said product with an excess of a halogen-containing transition metal compound, and separating the solid reaction product.

U.S. Pat. No. 3,925,338 to Ort teaches that control of particle size of olefin polymers produced by gas-phase polymerization of at least one olefin using Ziegler-type catalysts deposited on solid supports in a fluidized-solids operation is effected by controlling the particle size of the catalyst support. U.S. Pat. No. 4,232,140 also to Ort discloses the use of trichlorofluoromethane as a promoter in the polymerization and copolymerization of ethylene with supported Ziegler-type vanadium compound/alkylaluminum compound catalysts in the presence of hydrogen. Ort finds that polymer yields with his supported vanadium-based catalysts are too low for commercial viability unless the catalyst is promoted to high yield with the trichlorofluoromethane promoter. The viscosity ratio data in Ort's examples, which may be related to molecular weight distribution, indicate that none of the polymers have narrow molecular weight distribution. Ort does not teach or suggest how to avoid reactor fouling.

Fukuda et al. also teach that ethylene copolymers or terpolymers having narrow molecular weight distributions can be obtained by the use of an unsupported catalyst composition prepared by (1) mixing an alcohol containing 1 to 12 carbon atoms with $VOCl_3$ and then (2) mixing the mixture thus obtained with an alkylaluminum compound in the presence of the monomers to be interpolymerized, and there are other patents, e.g., Stamicarbon's British Pat. No. 1,175,593 and U.S. Pat. Nos 3,535,269 (Tanaka et al.) 4,071,674 (Kashiwa et al.) and 4,256,865 (Hyde et al.) which teach the use of catalyst compositions prepared by adding an alcohol at some stage during the catalyst preparation. However, although some of these patents are concerned with the production of polymers having narrow molecular weight distributions, none of them teaches a catalyst composition which satisfies the aforementioned need for a catalyst suitable for use in a commercially-attractive gas-phase polymerization process that is capable of producing injection molding-grade polymers having a good balance of physical properties.

SUMMARY OF THE INVENTION

An object of the invention is to provide an economical commercial polymerization process for preparing ethylene polymers having narrow-to-intermediate molecular weight distribution and a good balance of physical properties.

Another object is to provide non-fouling catalyst compositions which are useful in an economical gas-phase process for polymerizing one or more monomers comprising ethylene to polymers having a narrow-to-intermediate molecular weight distribution and a good balance of physical properties.

The foregoing objects of this invention are broadly accomplished by providing a process of polymerizing a monomer charge including ethylene comprising the steps of:

(a) drying an inorganic oxide having surface hydroxyl groups to form a support that is substantially free of adsorbed water;

(b) reacting the surface hydroxyl groups of the support with at least a substantially stoichiometric amount of at least one organometallic compound corresponding to the formula $R_xMR'_yR''_z$, wherein M is a metal of Group III of the periodic table, R is alkyl group containing 1 to 12 carbon atoms, R' and R'' are independently selected from the group consisting of H, Cl, and alkyl and alkoxy groups containing 1 to 12 carbon atoms, x has a value of 1 to 3, and y and z both represent values of 0 to 2, the sum of which is not greater than $3-x$;

(c) reacting the thus-treated support with at least about 0.001 mol, per mol of organometallic compound, of at least one vanadium compound corresponding to a formula selected from $(RO)_n$-$VOX_{3-n}$ and $(RO)_mVX_{4-m}$, in which formulas R represents a $C_1$-$C_{18}$ monovalent hydrocarbon radical that is free of aliphatic unsaturation, X is Cl or Br, n has a value of 0 to 3, and m has a value of 0 to 4;

(d) reacting the product of step (c) with at least about 0.1 mol, per mol of organometallic compound, of an alcohol containing 1 to 18 carbon atoms;

(e) feeding the product of step (d) into a gas-phase reaction zone;

(f) feeding, separately and independently of said feeding step (e), a trialkylaluminum into the gas-phase reaction zone in order to form a bed in the gas-phase reaction zone which comprises the product of step (d) and the trialkylaluminum;

(g) fluidizing the bed of step (f) at a pressure of between about 0.7 and 4.2 MPa and a temperature of between about 50° to 120° C. by diffusing underneath the bed of step (f) a gas mixture comprising ethylene, hydrogen, and chloroform at a rate sufficient enough to give a linear gas velocity in the bed of step (f) of between about 15 to 60 cm/sec;

(h) removing particulate polymerized substantially ethylene particles from the reaction zone; and (i) recycling unreacted gas mixture of step (g) from the top of the reaction zone to the bottom of the reaction zone.

DETAILED DESCRIPTION OF THE INVENTION

This invention is a novel process of polymerizing a monomer charge having ethylene. An inorganic oxide with surface hydroxyl groups is dried to form a support that is substantially free of adsorbed water. The surface hydroxyl groups of the support are reacted with at least a substantially stoichiometric amount of at least one organometallic compound corresponding to the formula $R_xMR'_yR''_z$, wherein M is a metal of Group III of the periodic table, R is an alkyl group containing 1 to 12 carbon atoms, R' and R'' are independently selected from the group consisting of H, Cl, and alkyl and alkoxy groups containing 1 to 12 carbon atoms, x has a value of 1 to 3, and y and z both represent values of 0 to 2, the sum of which is not greater than $3-x$. The thus-treated support is reacted with at least about 0.001 mol, per mol of organometallic compound, of at least one vanadium compound corresponding to a formula selected from $(RO)_nVOX_{3-n}$ and $(RO)_mVX_{4-m}$, in which formulas R represents a $C_1$-$C_{18}$ monovalent hydrocarbon radical that is free of aliphatic unsaturation, X is Cl or Br, n has a value of 0 to 3, and m has a value of 0 to 4. This product is reacted with at least about 0.1 mol, per mol of organometallic compound, of an alcohol containing 1 to 18 carbon atoms, in order to form a catalyst product. The catalyst product is fed into a gas-phase reaction zone. Separately and independently of this feeding, a trialkylaluminum is fed into the gas-phase reaction zone in order to form a bed in the gas-phase reaction zone which includes inter alia the catalyst product and the trialkylaluminum. The bed is fluidized at a pressure of between about 0.7 and 4.2 MPa and a temperature of between about 50° to 120° C. by diffusing underneath the bed including the catalyst product and trialkylaluminum a gas mixture comprising ethylene, hydrogen, and chloroform at a rate sufficient enough to give a linear gas velocity in the bed comprising catalyst product and trialkylaluminum of between about 15 to 60 cm/sec. Particulate polymerized substantially ethylene particles are removed from the reaction zone, and unreacted gas mixture of ethylene, hydrogen and chloroform is recycled from the top of the reaction zone to the bottom of the reaction zone.

The inorganic oxide used in preparing catalyst composition of the invention may be any particulate inorganic oxide or mixed oxide, e.g., silica, alumina, silica-alumina, magnesia, zirconia, thoria, titania, etc., having surface hydroxyl groups capable of reacting with the organometallic compound. However, it is generally an inorganic oxide selected from the group consisting of silica, alumina, magnesia and mixtures thereof, i.e., physical mixtures, such as mixtures of silica and alumina particles, etc., and/or chemical mixtures, such as magnesium silicate, aluminum silicate, etc. The surface hydroxyl groups may be at the outer surface of the oxide particles or at the surfaces of pores in the particles, the only requirement in this regard being that they be available for reaction with the organometallic compound.

The specific particle size, surface area, pore volume, and number of surface hydroxyl groups characteristic of the inorganic oxide are not critical to its utility in the practice of the invention. However, since such characteristics determine the amount of inorganic oxide that it is desirable to employ in preparing the catalyst compositions, as well as sometimes affecting the properties of polymers formed with the aid of the catalyst compositions, these characteristics must frequently be taken into consideration in choosing an inorganic oxide for use in a particular aspect of the invention. For example, when the catalyst composition is to be used in a gas-phase polymerization process—a type of process in which it is known that the polymer particle size can be varied by varying the particle size of the support—the inorganic oxide used in preparing the catalyst composition should be one having a particle size that is suitable for the production of a polymer having the desired particle size. In general, optimum results are usually obtained by the use of inorganic oxides having an average particle size in the range of about 30 to 600 microns, preferably about 30 to 100 microns; a surface area of about 50 to 1000 square meters per gram, preferably about 100 to 400 square meters per gram; and a pore volume of about 0.5 to 3.5 cc per gram, preferably about 0.5 to 2 cc per gram.

As indicated above, the organometallic compound that is reacted with the surface hydroxyl groups of the inorganic oxide in the practice of the invention may be any one or more organometallic compounds corresponding to the formula $R_xMR'_yR''_z$, wherein M is a metal of Group III of the periodic table, R is an alkyl group containing 1 to 12 carbon atoms, R' and R'' are independently selected from the group consisting of H, Cl, and alkyl and alkoxy groups containing 1 to 12 carbon atoms, x has a value of 1 to 3, and y and z both represent values of 0 to 2, the sum of which is not greater than $3-x$. Thus, M may be, e.g. aluminum, gallium, indium, or thallium; R may be, e.g., methyl, ethyl, propyl, isopropyl, n-butyl, n-pentyl, isopentyl, t-pentyl, hexyl, 2-methylpentyl, heptyl, octyl, 2-ethylhexyl, nonyl, decyl, dodecyl, etc; R', when present, may be H, Cl, an alkyl group, such as one of those exemplified above for R, which is the same as or different from R, or an alkoxy group, such as the alkoxy groups corresponding to the aformentioned alkyl groups; and R'', when present, may be any of the substituents mentioned above as exemplary of R' and may be the same as or different from R'.

The preferred organometallic compounds are those in which M is aluminum. Utilizable aluminum compounds include chlorides, such as dimethylaluminum chloride, diethylaluminum chloride, dipropylaluminum chloride, diisobutylaluminum chloride, the corresponding alkylaluminum dichlorides, etc., and mixtures of such chlorides, but the chlorides are generally not particularly preferred because of the halogen residue they contribute to polymers made in their presence. The more preferred aluminum compounds are the trialkylaluminums, dialkylaluminum hydrides, dialkylaluminum alkoxides, and alkylaluminum dialkoxides, such as trimethylaluminum, triethylaluminum, tripropylaluminum, tributylaluminum, triisobutylaluminum, isoprenylaluminum, trihexylaluminum, trioctylaluminum, tridecylaluminum, tridodecylaluminum, etc.; the corresponding alkoxy compounds wherein one or two of the alkyl groups have been replaced by alkoxy groups, such as ethylaluminum diethoxide, diethylaluminum ethoxide, ethylaluminum sesquiethoxide, ethylaluminum diisopropoxide, etc.; diethylaluminum hydride, di-n-propylaluminum hydride, diisobutylaluminum hydride, etc.; and mixtures of such compounds.

Especially preferred aluminum compounds are the trialkylaluminums, particularly triethylaluminum and tri-n-hexylaluminum, which are advantageous to employ because of their cost, availability, and/or effectiveness. When a trialkylaluminum is used as the organometallic compound, it is generally found that—all other factors being constant—the molecular weight distribution of polymers prepared with the catalysts of the invention are narrowed as the chain lengths of the alkyl groups of the trialkylaluminum are lengthened.

The amount of organometallic compound employed is at least substantially the stoichiometric amount, i.e., the amount required to react with all of the available hydroxyl groups on the inorganic oxide. Use of an amount less than the substantially stoichiometric amount would broaden the molecular weight distributions of polymers formed in the presence of the catalyst compositions; use of an amount greater than the substantially stoichiometic amount is permissable within the scope of the invention but frequently serves no practical purpose and can be disadvantageous in that the excess organometalic compound sometimes leads to fouling of the polymerization reactor if not removed from the catalyst composition prior to the composition's being used.

When the number of available hydroxyl groups on the particular inorganic oxide being treated is not known, it can be determined by any conventional technique, e.g., by reacting an aliquot of the inorganic oxide with excess triethylaluminum and determining the amount of evolved ethane. Once the number of available hydroxyl groups on the inorganic oxide is known, the amount of organometallic compound to be employed is chosen so as to provide at least about one mol of organometallic compound per mol of available hydroxyl groups.

The vanadium component of the catalyst compositions of the invention may be any one or more compounds corresponding to a formula selected from $(RO)_n VOX_{3-n}$ and $(RO)_m VX_{4-m}$, wherein R represents a monovalent hydrocarbon radical that contains 1 to 18 carbon atoms and is free of aliphatic unsaturation, X is Cl or Br, n has a value of 0 to 3, and m has a value of 0 to 4. Thus, the utilizable vanadium compounds include $VOCl_3$, $VOBr_3$, and the indicated mono-, di-, and trihydrocarbyloxy derivatives thereof, as well as $VCl_4$, $VBr_4$, and the indicated mono-, di-, tri-, and tetrahydrocarbyloxy derivatives thereof; and R, when present, may be a straight- or branched-chain alkyl, cycloalkyl, aryl, alkaryl, or aralkyl group, such as methyl, ethyl, propyl, isopropyl, butyl, isobutyl, pentyl, hexyl, cyclohexyl, heptyl, octyl, cyclooctyl, nonyl, decyl, dodecyl, hexadecyl, octadecyl, phenyl, benzyl, dimethylphenyl, ethylphenyl, etc. When mixtures of vanadium compounds are employed, the vanadium component may be a mixture of two or more compounds corresponding to either of the general formulas given above or a mixture of one or more compounds corresponding to one of those general formulas with one or more compounds corresponding to the other of those general formulas.

Ordinarily, when a vanadium compound of the $(RO)_n VOX_{3-n}$ type is employed, it is preferably a compound wherein X is Cl, because of the greater availability of such compounds; and it is preferably a monoalkoxy compound, since (1) all other factors being constant, the use of $VOCl_3$ or $VOBr_3$ in the preparation of the catalyst compositions of the invention does not permit the attainment of as narrow a molecular weight distribution as can be obtained when the polymerization reactions of the invention are conducted in the presence of the catalyst compositions that are prepared by the use of the hydrocarbyloxy derivatives of $VOCl_3$ or $VOBr_3$ and (2) the use of hydrocarbyloxy derivatives other than the monoalkoxy compounds does not appear to offer advantages that would compensate for the greater difficulty and cost of obtaining them. Thus, considering both cost and effectiveness in the practice of the invention, the preferred $(RO)_n VOX_{3-n}$ compounds are those compounds in which R is alkyl, X is Cl, and n has a value of about 1.

Ordinarily, when a vanadium compound of the $(RO)_m VX_{4-m}$ type is employed, it is preferably $VCl_4$ or a derivative thereof, most preferably $VCl_4$ itself. The use of $VCl_4$ in the preparation of catalyst compositions of the invention leads to the formation of compositions which are so satisfactory in the production of injection molding-grade ethylene polymers that there is seldom any reason to use a more expensive $(RO)_m VX_{4-m}$ compound instead of it.

The amount of vanadium compound(s) employed in the practice of the invention may be varied considerably but is generally such as to provide at least about 0.001 mol of vanadium compound per mol of organometallic compound. When the catalyst composition is to be prepared by the preferred process described below, wherein no washing step is utilized during or after preparation of the compositions, the amount of vanadium compound employed should not be substantially in excess of the amount capable of reacting with the treated support, i.e., about 1 mol of vanadium compound per mol of organometallic compound. Use of a greater amount would serve no practical purpose and could be disadvantageous in that the excess vanadium compound could lead to fouling of the polymerization reactor. However, a larger amount of vanadium compound may be employed when fouling of the reactor is not expected to be a problem and/or excess vanadium compound will be removed from the catalyst composition before the composition is used. In the practice of the invention, the amount of vanadium compound employed is generally not in excess of about 3 mols per mol of organometallic compound, and excellent results are obtained by the use of about 0.03 to 0.2 mol of vanadium compound per mol of organometallic compound, i.e. about 5 to 30 mols of organometallic compound per mol of vanadium compound.

As indicated above, the alcohol employed in preparing the present catalyst compositions may be any alcohol containing 1 to 18 carbon atoms; and it may be conveniently defined as a compound corresponding to the formula ROH, wherein R may be any of the groups, or types of groups, mentioned above as exemplary of the R groups of the utilizable hydrocarbyloxy compounds.

When the vanadium compound, or one of the vanadium compounds, employed in the practice of the invention is a hydrocarbyloxyvanadium compound that the catalyst manufacturer will synthesize for that use, it is frequently desirable, as a matter of convenience, to employ an alcohol component indentical to the alcohol required to synthesize the desired hydrocarbyloxyvanadium compound. However, it is not necessary for the R group of the alcohol to correspond to the R group of any hydrocarbyloxyvanadium compound being used to prepare the catalyst composition; and, in fact, correspondence of the R groups could be undesirable in some instances.

For example, if a practitioner of the invention wanted to use ethoxyvanadium oxydichloride as his vanadium compound but also wanted to prepare a catalyst composition that would provide the narrowest possible molecular weight distribution in polymers formed in its presence, it would be more desirable for him to use a long chain alcohol, rather than ethanol, as the alcohol, because all other factors being constant, the molecular weight distribution is narrowed as the chain length of the alcohol is increased. Increasing the chain length of the hydrocarbyloxy group tends to narrow the molecular weight distribution.

The preferred alcohols are primary alcohols, with n-alkanols containing 6 to 18 carbon atoms being particularly preferred.

The amount of alcohol used in preparing the catalyst composition of the invention should be at least about 0.1 mol per mol of organometallic compound employed. There is no maximum amount of alcohol that may be utilized, but its beneficial effects begin decreasing when an optimum amount is exceeded, so it is generally not used in excess of 10 mols per mol of organometallic compound. Ordinarily, the amount of alcohol utilized in the practice of the invention is in the range of about 0.2 to 3, preferably about 0.3 to 1, most preferably about 0.35 to 0.7, mols per mol of organometallic compound.

As indicated above, the catalyst compositions of the invention are prepared by drying the inorganic oxide, reacting the dried inorganic oxide with the organometallic compound, and reacting the thus-treated support with the vanadium compound, and then reacting that reaction product with the alcohol. The conditions under which the inorganic oxide is dried are not critical as long as they are adequate to provide an inorganic oxide that has surface hydroxyl groups and is substantially free of adsorbed water. However, it is ordinarily preferred to dry the inorganic oxide at about 100° to 1000° C., with or without a nitrogen or other inert gas purge, until substantially all adsorbed water is removed. Also, although improved results are obtained by the use of the catalyst compositions of the invention, regardless of the particular temperature at which the inorganic oxide is dried, the drying temperature has been found to have a negligible-to-noticeable effect on those results—optimum results generally being obtained when the inorganic oxide has been dried at about 200°-600° C., but drying temperatures of about 500°-600° C. generally being required for optimum results when the inorganic oxide is alumina. The time required for drying of the inorganic oxide varies, of course, with the particular drying temperature used but is usually in the range of about 5-16 hours.

When the inorganic oxide has been substantially freed of adsorbed water, its surface hydroxyl groups may be reacted with the organometallic compound in any suitable manner, conveniently by (1) adjusting its temperature, if necessary, to the temperature at which the reaction with the organometallic compound is to be conducted, (2) slurrying it in an inert liquid hydrocarbon, generally a $C_4$-$C_8$ hydrocarbon, such as isobutane, pentane, isopentane, hexane, cyclohexane, heptane, isooctane, etc., and mixtures thereof with one another and/or with other materials commonly present in commercial distillation cuts having the desired boiling range, (3) adding a substantially stoichiometric amount of the organometallic compound in neat or solution form, and (4) maintaining the organometallic compound in intimate contact with the inorganic oxide, e.g., by agitating the slurry, for a time sufficient to ensure substantially complete reaction with the available hydroxyl groups, generally at least about 5 minutes. The reaction may be conducted with or without pressure and at ambient or reflux temperatures, depending on the particular organometallic compound employed, as will be readily understood by those skilled in the art. When the organometallic compound is added in solution form, it is generally preferred, though not required, that the solvent be the same inert liquid hydrocarbon as is already present in the slurry.

The reaction of the vanadium component with the treated support may also be accomplished by conventional means, such as any of the techniques described in British Pat. No. 1,489,410, the teachings of which are incorporated herein by reference. However, it is most desirably accomplished simply by adding the vanadium compound in neat or solution form to the slurry of treated support and maintaining it in intimate contact with the treated support for a time sufficient to provide for substantially complete reaction, usually at least about 5 minutes and preferably about 10–60 minutes, although, actually, the reaction is virtually instantaneous.

When reaction of the vanadium component with the treated support has been completed, reaction with the alcohol may be accomplished in any suitable manner, conveniently just by adding the alcohol to the vanadium component/treated support reaction product and maintaining it in contact therewith, e.g., by agitating the slurry, for a time sufficient to ensure substantial completion of the desired reaction, usually at least about 5 minutes and most commonly about 30–60 minutes. All that is critical about the manner in which the alcohol is reacted with the other catalyst components is the time at which it is added to the system. Reaction of the other components with one another must be substantially complete before the alcohol is added in order for the catalyst compositions to have the desired performance capabilities.

After the alcohol has been reacted with the other catalyst components, the resultant catalyst composition may or may not require further treatment to make it suitable for use, depending on the particular process that has been used to prepare the catalyst composition and the particular type of polymerization process in which it is to be used. For example, if the catalyst composition has been prepared by a type of process which results in its being already dry when reaction with the alcohol has been accomplished, no further treatment is likely to be necessary if the composition is to be used in a gas-phase polymerization process; but slurrying of the composition in a suitable liquid medium may be desirable if it is to be used in a slurry or solution polymerization process. On the other hand, if the catalyst composition has been prepared by the preferred process described above, i.e., if the inorganic oxide has been slurried in a liquid medium prior to the addition of the other components, it is already suitable for use in a slurry or solution polymerization process but will have to be dried to make it suitable for use in a gas-phase polymerization process. When the composition is to be dried, i.e., freed of any liquid medium used in its preparation, the drying may be achieved by any conventional technique, e.g., filtration, certrifugation, evaporation, blowing with nitrogen, etc. Commerical preparation of the catalyst of this invention is preferably carried out as taught by Rogers in U.S. Pat. No. 4,426,317.

Regardless of the particular technique used to prepare the catalyst compositions of the invention, it should be kept in mind that they are Ziegler catalysts and are therefore susceptible to poisoning by the materials, such as oxygen, water, etc., that are known to reduce or destroy the effectiveness of Ziegler catalysts. Accordingly, they should be prepared, stored, and used under conditions that will permit them to be useful as polymerization catalyts, e.g., by the use of an inert gas atmosphere, such as nitrogen.

The invention is particularly advantageous in that it provides catalyst compositions which (1) have the active ingredients chemically-attached to an inorganic oxide support, (2) are capable of producing ethylene polymers having a narrow-to-intermediate molecular weight distribution, as desired, and a good balance of physical properties by an economical gas-phase process that gives a high yield of polymer and (3) do not foul gas phase reactors. The fact that high yields of polymer can be obtained by the use of the catalyst compositions is particularly unexpected in that these high yields are attainable even when the catalyst compositions are prepared by the preferred process wherein no washing step is required or utilized during or after preparation of the compositions. Both experience in the field and the teachings of the prior art indicate that at least one washing step should be required in the preparation of such compositions when high yield catalysts are desired.

After the catalyst composition of this invention is prepared, it is subsequently introduced into a gas-phase fluidized reactor similar to that taught by Miller in U.S. Pat. No. 4,003,712 which will be incorporated by refercnce herein. In a preferred embodiment of the invention, the diameter of the velocity reduction or disengaging zone at the top of Miller's reactor is enlarged and the cyclone and filter in the gas recycle system are eliminated for stable, long-term commercial operation. It should be understood that polymerization with the catalyst compositions of this invention may be conducted in any fluidized system which has a distribution plate means and allows a monomer gas to fluidize a bed including the catalyst compositions; allows unreacted monomer gas to be recycled from the top of the fluidized system back to the bottom of the fluidized system or for admixing with the monomer gas prior to its diffusing or passing through the fluidized bed; allows a polymer product to be withdrawn from the fluidized bed; allows catalyst and a trialkylaluminum to be added to the fluidized bed; and provides for the removal of the heat of polymerization. Size, shape, pressure rating, heat removal capability, and other factors can limit the polymer production capacity of the gas-phase fluidized-bed reaction systems of this invention. The process of this invention may be practiced in commercial facilities having production capacities of 50,000 to 250,000 metric tons per year or more. The process of this invention may also be practiced in laboratory scale reactors having a production capacity of from about 0.1 to 1.0 kg/hr or in pilot plant reactors having production capacities of from 5 to 500 kg/hr.

The catalyst compositions of this invention should preferably be injected or fed to the fluidized bed system at a point between the distribution plate and about $\frac{7}{8}$ of the height of the catalyst bed from the distribution plate of the reactor. More preferably, the catalyst compositions are fed into the fluidized bed system at a point of between about $\frac{1}{8}$ to about $\frac{1}{2}$ of the height of the fluidized bed. Injection of the catalyst composition above about $\frac{1}{8}$ of the height of the bed (as opposed to below $\frac{1}{8}$ of the height) offers distribution of the catalyst composition throughout the entire ongoing fluidized bed to retard and/or preclude the formation of localized spots of high catalyst composition concentration which would result in the formation of "hot spots" at or near the distribution plate. A "hot spot" is a localized region in which the exothermic heat of polymerization is not dissipated before some polymer heats to the softening point of the polymer. Any introduction of the catalyst compositions of this invention at a point above about $\frac{7}{8}$ of the height of the fluidized bed from the distribution plate of the reactor may lead to excessive carryover of the fresh catalyst of this invention into the gas recycle system. The rate of injection or rate of feed of the catalyst composition of this invention is any suitable rate which is equal to catalyst consumption in the polymerization process of this invention and generally depends on the size of the fluidized bed system. The rate of production of the particulate polymerized substantially ethylene particles in the fluidized bed is partly determined by the rate of catalyst injection. We have found that the rate of injection of the catalyst for our polymerization process is generally preferably at a rate that maintains the concentration of the vanadium in the fluidized bed between about 1/10 ppm to about 50 ppm based on weight of vanadium metal divided by total solids in the bed. More preferably, the rate of injection of the catalyst is that which would maintain the concentration of the vanadium in the fluidized bed between about 0.50 ppm to about 10 ppm; most preferably, between about 1 ppm to about 4 ppm. The fluidized bed is substantially particulate polymerized ethylene polymer particles formed by polymerization of the monomer(s) on the catalyst compositions of this invention.

In order for the catalyst composition of this invention to give high yield of polymer product per unit of vanadium component, we have discovered that it is necessary to add or inject at least one trialkylaluminum compound into the fluidized bed system as a co-catalysts. For a variety of reasons, it is preferred to add the trialkylaluminum compound, or the mixture of trialkylaluminum compounds, that is being used as a co-catalyst directly to the fluidized bed separately and independently of the catalyst and at an injection point removed from the catalyst injection point. However, the process of this invention does not depend on the method of feeding the trialkylaluminum co-catalyst or the location of its injection point. The trialkylaluminum compounds of this invention may be fed to the fluidized bed as pure compounds, or in solution in a liquid hydrocarbon which will vaporize in the fluidized bed. Suitable hydrocarbon solvents include, but are not limited to, isobutane, isopentane, hexane, heptane and mixtures thereof.

The trialkylaluminum of this invention may be any trialkylaluminum wherein the alkyl or combination of alkyl groups contain between 1 and about 36 carbon atoms. In a preferred embodiment of the invention, the alkyl group or combination of alkyl groups contain between 1 and about 12 carbon atoms. Suitable trialkylaluminum compounds have been found to include trimethyl-, triethyl,- tri-i-butyl-, tri-n-hexyl-, tri-n-octyl- and ethyl di-i-butylaluminum. It should be understood that trialkylaluminum compounds add ethylene, and alpha olefins to some extent, under the operating temperatures and pressures of the polymerization process of the invention. Thus, an ethyl group on aluminum may be inserted by ethylene to become a butyl group, etc. Therefore, there is no reason to believe or require that all alkyl groups on the aluminum be the same. There is every reason to believe that mixtures of trialkylaluminum compounds are generated during polymerization and are as effective as pure compounds. Since the exact composition of the alkyl groups on aluminum during the polymerization process of this invention is not known because of the ethylene insertion reaction, all of the trialkylaluminum species in the fluidized bed are referred to collectively for the purposes herein as "trialkylaluminum".

As was the case for the catalyst composition of this invention, the rate of injection of the trialkylaluminum is also any suitable rate which is equal to the trialkylaluminum consumption in the polymerization process, and also depends on the size of the fluidized bed system. Polymer productivity from the polymerization process is not only determined by the rate of catalyst injection, but also from the rate of trialkylaluminum injection.

Assuming that the trialkylaluminum compounds of this invention remain in the fluidized bed and assuming uniform distribution of trialkylaluminum throughout the fluidized bed, the molar concentration of trialkylaluminum may be calculated from the molar feed rate of the trialkylaluminum being fed into the fluidized bed reaction system and the withdrawal rate of the polymer product particles. Likewise, assuming uniform distribution of the catalyst composition throughout the fluidized bed, the molar concentration of the vanadium component of the catalyst composition may be calculated from the molar feed rate of the vanadium component of the catalyst composition being fed into the fluidized bed reaction system and the withdrawal rate of the polymer product particles. At stable, lined-out operating conditions, the ratio of the molar concentration of the trialkylaluminum to the molar concentration of the vanadium component in the bed of catalyst composition will asymptote to the ratio of the molar feed rate of the trialkylaluminum to the molar feed rate of the vanadium components of the catalyst composition of this invention. For the catalyst composition of this invention, the injection rate of the trialkylaluminum should be such that the Al/V ratio in the fluidized bed of the molar concentration of the trialkylaluminum to the molar concentration of the vanadium component is between about 1 to about 5,000. We have found that the activity of the catalyst composition of the invention is maximized in a certain range of trialkylaluminum to vanadium molar ratio. Too little or too much trialkylaluminum suppresses the activity of the catalyst composition and the polymer production. It has been determined that a plot of the trialkylaluminum to vanadium molar ratio versus the catalyst (of this invention) activity possesses a generally flat peak and the optimum trialkylaluminum to vanadium molar ratio lies in the range of from about 2 to about 500, with from about 2 to 60 being the most preferred from the standpoint of minimizing catalyst residue levels in the polymer and trialkylaluminum cost. Therefore, the preferred injection rate of the trialkylaluminum into the fluidized bed system of this invention is that injection rate wherein the molar ratio in the fluidized bed of the molar concentration of the trialkylaluminum to the molar concentration of the vanadium composition is between about 2 to 500, and most preferably from about 2 to about 60.

The bed of particulate polymerized substantially ethylene particles, trialkylaluminum and the catalyst composition of this invention has to be fluidized at a pressure of between about 0.7 and 4.2 MPa and a temperature of between about 50° to 120° C. Fluidization is conducted by diffusing underneath the bed (and through the distribution plate) a gas mixture comprising ethylene, hydrogen and chloroform at a rate sufficient enough to give a linear gas velocity in the bed of between about 15 to about 60 cm/sec. The gas mixture will also include inert gas which is used to feed the catalyst compositions to the fluidized bed. A majority of the gas mixture is in the form of unreacted gas mixture that is recycled from the top of the reaction zone to the bottom of the fluidized bed of the reaction zone.

Although the catalyst compositions and the trialkylaluminum of this invention polymerize ethylene and other olefins over a wide range of temperatures, there is a practical limitation to the temperatures at which the gas-phase fluidized-bed process of this invention is commercially viable. For example, above about 120° C., ethylene polymers soften and tend to agglomerate in a fluidized bed, leading to formation of lumps, loss of fluidization, and onset of an inoperable condition. Below about 50° C., the production rate of commercial reactors becomes so low that the process is no longer profitable. It is generally desirable to operate near the highest temperature at which the polymer will not agglomerate in the bed with a temperature safety factor for small temperature upsets so that inoperable conditions are not encountered even briefly. Therefore, the preferred temperature range is from about 65°–115° C., with the range from about 75°–110° C. being most preferred.

The pressure at which the polymerization process of this invention is conducted is selected on the basis of desired commercial operation rather than upon some limitation of the catalyst. The catalysts of this invention will function at atmospheric, subatmospheric, or superatmospheric pressures. For economy of operation, one wishes to polymerize near the highest pressure for which the equipment is designed in order to maximize the production rate for the equipment. But, because commercial process equipment generally is more expensive with the higher pressure, there is a natural tendency to design commercial equipment for low pressures. These constraints lead to a commercial operating range of about 0.7–4.2 MPa. At the lower pressures, however, higher dwell or residence times in the reactor are required to reach high yields of polymer per unit of catalyst. At the higher pressures, there is little room to safely accommodate pressure upsets. These constraints lead to a preferred pressure range of about 1.6–3.9 MPa.

In order to provide sufficient mixing and agitation in the bed of trialkylaluminum and catalyst that "hot spots" will not develop, it is necessary that the flow rate of the gas mixture through the bed of polymer particles containing traces of the catalyst and the trialkylaluminum be sufficient to fluidize the particles. For the powdered polymer particles produced by the catalyst compositions of this invention, the minimum fluidization velocity, $G_{mf}$, has been determined to be about 15 cm/sec. As gas velocity increases, a point is reached at which the particles are largely swept out of the bed by the force of the rising gas (the transport velocity), which, for the particles of the present invention is about 4 $G_{mf}$, or 60 cm/sec. To provide some margin for operating error, the preferred velocity range is about 1.5-3.0 $G_{mf}$, or about 23-45 cm/sec, in contrast to the 3-5 $G_{mf}$ range preferred by Miller in U.S. Pat. No. 4,003,712 for his catalysts.

The catalysts of this invention, under the commercial conditions described above, in the absence of a chain transfer agent, produce polymer of a molecular weight too high for conventional melt processing. Therefore, in the commercial practice of this invention the fluidizing gas mixture must contain hydrogen during polymerization to adjust the molecular weight (as determined by melt index) to the desired range for the product being produced. This is done by increasing the hydrogen/ethylene ratio to raise melt index (lower molecular weight), or reducing the ratio to produce the opposite effect. The catalyst compositions of this invention are sensitive to hydrogen, so it is generally not necessary to use more than 10% by vol. of hydrogen even to produce the highest melt index polymer. Furthermore, when used as described herein, altering the hydrogen/ethylene ratio to increase melt index does not cause a loss of production rate in a commercial plant within the range of melt indexes used for commercial polymers at this time. Preferably, the amount of hydrogen utilized in a preferred embodiment of the invention in order to control the molecular weight of the produced polymer is between about 0.10% to about 10.0% by volume of the total gas mixture volume.

The gas mixture has to have chloroform in order that the catalyst compositions of this invention can have their activity promoted. While other halogenated carbon compounds such as methylene chloride and fluorotrichloromethane may work as promoters, from the standpoints of promotion of catalyst activity, cost, availability, ease of handling, and catalyst promotion without causing reactor fouling, chloroform is clearly the compound of choice. Only small amounts are needed because of its effectiveness. Under the conditions of polymerization, it is a gas, and generally will be present in the recycle gas at concentrations between about 0.0001 to about 1.000% by vol of the gas mixture. Since the preferred vol % ranges for hydrogen and chloroform is respectively between about 0.10 and about 10.0 and between about 0.0001 and about 1.000, the remaining vol % for any given volume of the gas mixture would include ethylene and any of the inert gas which is used to feed the catalyst compositions to the fluidized bed in the reaction zone. In a preferred embodiment of the invention, ethylene preferably comprises between about 50.0 vol % and about 99.9 vol % of the gas mixture.

It appears that the molar ratio $CHCl_3/V$ is more useful in predicting and understanding its effect than the overall concentration in the gas, since it affects the catalyst's performance. The $CHCl_3/V$ ratio may vary from about 2 to about 5000. Because chloroform is relatively inexpensive and used in small amounts, there is no real economic incentive to minimize its use. However, there appears to be a maximum in the curve of catalyst activity vs. $CHCl_3/V$ ratio, with a broad optimum in the range of about 10-500. There also appears to be an interaction between the optima for $CHCl_3/V$ ratio and Al/V ratio such that lower $CHCl_3/V$ ratios are generally preferred when the Al/V ratio is low, and higher $CHCl_3/V$ ratios are generally preferred when the Al/V is high. Other factors, such as impurity levels, may also cause a shift in the optimum $CHCl_3/V$ ratio or Al/V ratio, but generally such factors will not shift the optima outside the preferred ranges.

We have found that, in order to control the density of the produced ethylene polymer, the gas mixture of ethylene, hydrogen and chloroform may include alpha olefins which will be copolymerized with the ethylene of the gas mixture. Although the catalyst compositions of this invention will copolymerize essentially any alpha olefin with ethylene, there is a practical limit to what can be effectively done in a gas-phase reaction. Generally, olefins having more than 8 carbon atoms have too low a vapor pressure to be used in high enough concentration to have much effect on density. Propylene, butene-1, hexene-1, 4-methylpentene-1, and octene-1 are among the alpha olefins useful in copolymerization with ethylene in this invention. Preferably, mixtures of alpha olefins having 3 to 8 carbon atoms are used in a preferred embodiment of this invention. By this process, polymers generally considered to be HDPE (densities of 0.940 or greater) and LLDPE (densities below 0.940) may be made equally well by adjusting comonomer concentration in the feed or other factors. The amount of comonomer needed is determined by the density of the polymer product being made. Generally, not less than 0.5 vol % of alpha olefin will be used and not more than 30 vol % of the alpha olefin will be utilized for any given volume of the gas mixture along with any of the inert gas and between about 0.10 vol % and about 10.0 vol % of hydrogen, between about 0.0001 vol % and about 1.000 vol % chloroform, and between about 50.0 vol % and about 99.4 vol % ethylene.

The catalyst compositions of this invention are preferably fed to the gas-phase fluidized-bed reactor as a dry particulate matter, such as dry powder under the inert gas. Any gas that does not react with the catalyst is considered inert. Suitable inert gases include nitrogen, argon, and methane. Any device which can measure and convey a free-flowing powder is suitable for feeding the catalyst, although the device must not allow monomer to enter the catalyst storage area of the feed device. Once the catalyst has been measured and delivered to the catalyst feed line, any good method of conveying it to the fluidized bed may be used. These include mechanical means such as screw conveyers, or gas conveying with inert gas or, as Miller teaches, with recycle gas from the reactor. Catalyst may be added continuously, semi-continuously, or discontinuously to the reactor. Continuous addition is preferred, but is virtually impossible at laboratory scale. Catalyst may be fed pure or may be diluted with any free-flowing particulate material such as pure, dry support or polymer powder from the reactor. In catalyst feeding, all that is really critical is that the catalyst be fed at a controlled rate and be dispersed in the bed before a "hot spot" develops.

The produced particulate polymerized substantially ethylene particles may be removed from the gas-phase reaction zone by any suitable means and at any suitable location. Preferably, the produced ethylene polymer particles are removed in accordance with the procedure described by Miller in U.S. Pat. No. 4,003,712. In a preferred embodiment of the invention, the produced ethylene polymer particles are removed from the gas-phase reaction zone above and in proximity to the distribution plate.

As has been mentioned, it is necessary to have good fluidization, good catalyst mixing, and good distribution of gas in the bed in order to avoid "hot spots" which cause lumps to form in the bed. These lumps themselves disturb fluidization so, once a lump forms, the tendancy for other lumps to form is enhanced. Eventually a reactor shut down is necessary because the process becomes inoperable.

Similarly, it is necessary for long-term, stable operation of commercial reactors that the surfaces of the reactor and distribution plate remain clean. If a polymer coating (fouling) builds up on a reactor surface, several undesirable things may happen. First, fouling on the distribution plate tends to perturb the desired gas distribution and restrict the ability of the polymer particles at the plate to move laterally. Both effects tend to produce "hot spots" at or near the distribution plate. Second, fouling on the reactor wall inhibits the normal downward motion of fluidized particles at the wall surface. Particles which "hang up" at a wall surface can generate "hot spots". Third, the wall coating may come loose in places, fall into the bed, and disrupt fluidization as any lump would do. Even worse, wall fouling usually is in the form of a "sheet" rather than a lump, and produces severe gas channelling in the bed if it falls off.

Although poor selection of operating conditions or poor operating techniques may lead to lump formation, it appears that fouling of reactor surfaces depends primarily on the catalyst used. Some catalysts tend to produce fouling, and some do not. At this time, insufficient experience has been gained to be able to predict with accuracy which catalyst compositions will foul and which will give stable operation for months without fouling reactor surfaces. Obviously, for economical commercial operation, the catalyst must not foul reactor surfaces. Fouling in a commercial reactor leads to "down time" with consequent loss of production and extra maintenance cost for cleaning. Thus, fouling will cause a gas-phase fluidized-bed process to lose its economic advantage over slurry processes.

The following examples are given to illustrate the invention and are not intended as a limitation thereof. In these examples, compositions and processes that are illustrative of the invention are distinguished from those that are outside the scope of the invention and are included only for comparative purposes by using an alphabetic designation for any example or run that is a comparative example and a numeric designation for the examples and runs that are illustrative of the invention. Yields given in the examples are measures of productivity in terms of the number of grams of polymer produced per gram of catalyst per hour, melt indices ($MI_2$) are those determined by ASTM test D-1238-65T using a 2160-gram weight, while the NVR values are "normalized" melt viscosity ratios determined by measuring the apparent viscosities of the polymers at 30 sec$^{-1}$ and 300 sec$^{-1}$, respectively, at 200° C. in an Instron capillary rheometer and (2) normalizing them to $V_{30}=5$ by the equation.

$$NVR = antilog\ (0.14699 + 0.7897\ \log V_{30} - \log V_{300})$$

where $V_{30}$ and $V_{300}$ are the measured apparent viscosities.

This normalization permits comparison of the viscosity ratios of polymers having different $V_{30}$ values, since the unnormalized $V_{30}/V_{300}$ ratio is a function of $V_{30}$. The NVR is constant for any given catalyst over an $MI_2$ range of about 1–30, and only slight deviations occur outside of that range.

In the examples, the following procedures are used to prepare the catalyst compositions and polymers.

PREPARATION OF CATALYSTS

In the preparation of each of the catalysts, dry a commercial inorganic oxide by heating it under dry, deoxygenated nitrogen for 5-16 hours at a temperature of 200°-600° C. to provide an activated oxide containing about 1-1.4 mmols of available hydroxyl groups per gram. Cool the activated oxide to ambient temperature under a purified nitrogen blanket, suspend it in commercial hexane, add neat organometallic compound, and stir the resultant slurry for 30-60 minutes. Then add a vanadium compound in neat or solution form, stir the resultant slurry for an additional 30-60 minutes, add an alcohol, stir for another 30-60 minutes, and remove the hexane under a nitrogen purge to produce a powdered solid catalyst. The particular ingredients used to prepare the catalysts, the amounts of organometallic, vanadium, and alcohol compounds added per gram of inorganic oxide, and the particular temperatures used to dry the inorganic oxides are shown in the examples and/or tables.

Throughout the examples the commercial magnesium oxide used is Merck Maglite D, an inorganic oxide having a surface area of about 150–200 square meters per gram, a pore volume of about 1.2-1.5 cc per gram, and an average particle size of about 30–40 microns; the commercial silica employed is Davison 952 silica gel, an inorganic oxide having a surface area of about 250–350 square meters per gram, a pore volume of about 1.5–1.7 cc per gram, and an average particle size of about 65–75 microns; the commercial alumina is Norton 6376, an inorganic oxide having a surface area of more than 100 square meters per gram and a pore volume of about 0.8–1.1 cc per gram; and the commercial aluminum silicate and magnesium silicate are W. R. Grace's materials having the designations XSZ-AL-65C and XSZ-MG-66C, respectively.

SLURRY POLYMERIZATION

Charge 1.5 liters of dry hexane to a suitable autoclave under a dry, deoxygenated nitrogen atmosphere, add 2.1 mmols of triethyaluminum as an activator-scavenger, stir for 5 minutes, and add a slurry of 0.1–0.4 gram of catalyst powder in, respectively, 1–4 ml of commerical hexane. Raise the temperature of the reactor to 85°–90°C. , add enough hydrogen to ensure the production of a polymer having a molecular weight such that its $MI_2$ will be within the range of about 1–30, raise the reactor pressure to about 2.1 MPa with ethylene, and any comonomer(s) being employed, and hold the pressure at that level throughout the polymerization by adding monomer as needed. Immediately after pressurizing the reactor with monomer, add 0.17 mmol of chloroform as a promoter; and, at 15-minute intervals thereafter, add supplemental 0.17 mmol aliquots of the promoter. After one hour, stop the polymerization by venting the autoclave, opening the reactor, and filtering the polymer from the liquid medium, and drying the polymer. Then dry the polymer under vacuum at 60° C. for 4 hours.

LABORATORY GAS-PHASE POLYMERIZATION

The laboratory apparatus consisted of a continuous polymerization reaction system essentially as depicted by Miller in the drawing of U.S. Pat. No. 4,003,712, with two exceptions: there was no filter in the gas recycle line, and the catalyst was fed to the reactor with nitrogen only. The reaction zone was 10 cm in diameter, 120 cm tall. Recycle gas passed through a velocity reduction or disengaging zone atop the reactor, through a cyclone separator, through a centrifugal compressor, and into the bottom of the reactor where the gas was distributed into the fluidized bed by a dispersion or distribution plate. Heat exchange was effected by circulating pressurized tempered water through jacketing on the recycle gas piping. This system had a rated capacity of 450 g of polymer per hour. Generally, for catalyst screening studies, the system was operated as follows:

Introduce a stream or streams of ethylene, any comonomer(s), chloroform, and hydrogen to the reactor. Continuously withdraw unreacted or recycle gas from the top of the disengaging zone, pass it through a heat exchanger to maintain a bed temperature of about 95°–100° C., and introduce it at the bottom of the reactor at a rate sufficient to give a superficial velocity of about 25 cm/sec in the bed.

Introduce make-up monomer, chloroform, and hydrogen into the recycle gas line so as to maintain constant gas composition as detected by on-line analyzers and so as to maintain the reactor pressure at about 3.5 MPa and to provide about 40 mmols of chloroform per mmol of vanadium per hour, and feed fresh catalyst particles into the reactor below the top of the bed so as to provide a vanadium feed rate of one mmol per hour. Add triethylaluminum as a scavenger and cocatalyst during the polymerization so as to provide a triethylaluminum feed rate of 20 mmol per hour. Withdraw polymer product semi-continuously from the bottom of the bed at a rate such as to maintain a constant bed level. Take aliquots of withdrawn polymer for testing.

EXAMPLE I

Prepare five catalyst compositions by the catalyst preparation procedure described above, except for using no alcohol in the preparation of the first composition. In each case, employ MgO as the inorganic oxide, triethylaluminum as the organometallic compound, ethoxyvanadium oxydichloride as the vanadium compound, and ethanol as the alcohol, when employed; and dry the support at about 200° C. Use each of the catalyst compositions to prepare polyethylene by the slurry polyermization procedure described above. The amounts of ingredients employed in the production of the catalyst compositions, and the yields, melt indices, and normalized viscosity ratios (NVR), i.e., molecular weight distributions, of the polymers are shown in Table I.

TABLE I

| Run # | Catalyst Composition | Yield | $MI_2$ | NVR |
|---|---|---|---|---|
| A | $(C_2H_5O)VOCl_2/Al(C_2H_5)_3/MgO$<br>0.2 mmol  1.0 mmol  1 g | 70 g | 1.0 | 2.29 |
| 1 | $C_2H_5OH/(C_2H_5O)VOCl_2/Al(C_2H_5)_3/MgO$<br>0.2 mmol 0.2 mmol  1.0 mmol  1 g | 104 g | 4.6 | 2.25 |
| 2 | $C_2H_5OH/(C_2H_5O)VOCl_2/Al(C_2H_5)_3/MgO$<br>0.5 mmol 0.2 mmol  1.0 mmol  1 g | 85 g | 2.5 | 2.14 |
| 3 | $C_2H_5OH/(C_2H_5O)VOCl_2/Al(C_2H_5)_3/MgO$<br>1.0 mmol 0.2 mmol  1.4 mmol  1 g | 30 g | 4.1 | 2.10 |
| 4 | $C_2H_5OH/(C_2H_5O)VOCl_2/Al(C_2H_5)_3/MgO$<br>1.4 mmol 0.1 mmol  1.4 mmol  1 g | 138 g | 4.2 | 2.06 |

As demonstrated above, the addition of ethanol, as the last-added component, with an ehtoxyvanadium oxydichloride/triethylaluminum/magnesium oxide catalyst composition results in the formation of a catalyst composition that narrows the molecular weight distribution of polymers formed in its presence—this narrowing of the molecular weight distribution being progressive as the amount of ethanol used is increased from 0.2 to 1.0 per mol of triethylaluminum. The following examples shows that polymers having narrow molecular weight distributions can also be obtained when an alkylaluminum alkoxide is substituted for a trialkylaluminum in the practice of the invention.

EXAMPLE II

Prepare a catalyst composition by the catalyst preparation procedure described above, using MgO as the inorganic oxide, drying it at about 200° C., and sequentially reacting with 1.0 mmol of diethylaluminum ethoxide, 0.2 mmol of ethoxyvanadium oxydichloride, and 1.0 mmol of ethanol per gram of silica. When the catalyst composition is used to prepare polyethylene by the slurry polymerization procedure described above, the process results in the production of 80 grams of polymer having a melt index of 3.0 and an NvR value of 2.12.

EXAMPLE III

Prepare two $CH_3OH/(n—C_{18}H_{37}O)VOCl_2/Al(C_2H_5)_3/SiO_2$ catalyst compositions by the catalyst preparation procedure described above, employing the same amounts of ingredients in each case, i.e., 1.5 mmol of triethylaluminum, 0.2 mmol of n-octadecoxyvanadium oxydichloride, and 1.0 mmol of methanol per gram of silica, but using a drying temperature of about 200° C. for the silica used in producing the first of the compositions and a drying temperature of about 550° C. for the silica used in producing the second of the compositions. Then use each of the catalyst compositions to prepare polyethylene by the slurry polymerization procedure described above. The yields, melt indices, and NVR values of the polymers are shown in Table II.

TABLE II

| Run # | Support Drying Temp. | Yield | $MI_2$ | NVR |
|---|---|---|---|---|
| 5 | 200° C. | 170 g | 5.4 | 2.34 |
| 6 | 550° C. | 198 g | 4.6 | 1.99 |

The preceding example and the following three examples show that the use of different inorganic oxides, different alkoxyvanadium compounds, and different alcohols which may or may not have the same chain length as the alkoxy groups of the vanadium compounds employed, as well as the use of different support drying temperatures, are permissable within the scope of the invention and lead to the formation of catalyst compositions that can be used to prepare polymers having narrow-to-intermediate molecular weight distributions. These examples also show that, in general, narrower molecular weight distributions are obtained when the catalysts used in the preparation of ethylene polymers are formed by the use of supports that have been dried at the higher temperatures within the preferred range of drying temperatures taught in the specification.

EXAMPLE IV

Prepare three n—$C_8H_{17}OH$/(n—$C_8H_{17}O$)$VOCl_2$/$Al(C_2H_5)_3$/$SiO_2$ catalyst compositions by the catalyst preparation procedure described above, employing the same amounts of ingredients in each case, i.e., 1.4 mmol of triethylaluminum, 0.2 mmol of n-octoxyvanadium oxydichloride, and 1.0 mmol of n-octanol per gram of silica, but using different drying temperatures for the silica used in producing each of the compositions, i.e., 200° C., 350° C., and 550° C., respectively. Then use each of the catalyst compositions to prepare polyethylene by the slurry polymerization procedure described above. The yields, melt indices, and NVR values of the polymers are shown in Table III.

TABLE III

| Run # | Support Drying Temp. | Yield | MI$_2$ | NVR |
|---|---|---|---|---|
| 7 | 200° C. | 55 g | 1.8 | 2.32 |
| 8 | 350° C. | 146 g | 2.1 | 2.41 |
| 9 | 550° C. | 320 g | 20.2 | 1.95 |

EXAMPLE V

Prepare two n—$C_8H_{17}OH$/(n—$C_8H_{17}O$)$VOCl_2$/$Al(C_2H_5)_3$/$Al_2O_3$ catalyst compositions by the catalyst preparation procedure described above, employing the same amounts of ingredients in each case, i.e., 1.4 mmol of triethylaluminum, 0.2 mmol of n-octoxyvanadium oxydichloride, and 1.0 mmol of n-octanol per gram of alumina, but using a drying temperature of about 200° C. for the alumina used in producing the first of the compositions and a drying temperature of about 550° C. for the alumina used in producing the second of the compositions. Then use each of the catalyst compositions to prepare polyethylene by the slurry polymerization procedure described above. The yields, melt indices, and NVR values of the polymers are shown in Table IV.

TABLE IV

| Run # | Support Drying Temp. | Yield | MI$_2$ | NVR |
|---|---|---|---|---|
| 10 | 200° C. | 47 g | 6.9 | 2.16 |
| 11 | 550° C. | 83 g | 11.6 | 1.65 |

EXAMPLE VI

Prepare two n—$C_8H_{17}OH$/(n—$C_8H_{17}O$)$VOCl_2$/$Al(C_6H_{13})_3$/$Al_2O_3$ catalyst compositions by the catalyst preparation procedure described above, employing the same amounts of ingredients in each case, i.e., 1.5 mmol of tri-n-hexylaluminum, 0.2 mmol of n-octoxyvanadium oxydichloride, and 1.0 mmol of n-octanol per gram of alumina, but using a drying temperature of about 200° C. for the alumina used in producing the first of the compositions and a drying temperature of about 500° C. for the alumina used in producing the second of the compositions. Then use each of the catalyst compositions to prepare polyethylene by the slurry polymerization procedure described above. The yields, melt indices, and NVR values of the polymers are shown in Table V.

TABLE V

| Run # | Support Drying Temp. | Yield | MI$_2$ | NVR |
|---|---|---|---|---|
| 12 | 200° C. | 48 g | — | 1.91 |
| 13 | 500° C. | 355 g | 18.6 | 1.67 |

As demonstrated above, particularly when #12 of this example is compared with Run #10 of the preceding example, the substitution of a higher trialkylaluminum for a lower trialkylaluminum in preparing the catalyst compositions of the invention can lead to a narrowing of the molecular weight distribution of polymers formed in the presence of the catalyst compositions when all other factors are substantially constant.

EXAMPLE VII

Prepare three n—$C_8H_{17}OH$/(n—$C_8H_{17}O$)$VOCl_2$/$Al(C_6H_{13})_3$/inorganic oxide catalyst compositions by the catalyst preparation procedure described above, employing the same amounts of ingredients in each case, i.e., 1.4 mmol of tri-n-hexylaluminum, 0.1 mmol of n-octoxyvanadium oxydichloride, and 0.25 mmol of n-octanol per gram of inorganic oxide, and drying the support at about 250° C. in each case, but using different inorganic oxides as the supports, i.e., silica, magnesium silicate, and aluminum silicate, respectively. Then use each of the catalyst compositions to prepare polyethylene by the slurry polymerization procedure described above. The melt indices and NVR values of the polymers are shown in Table VI.

TABLE VI

| Run # | Inorganic Oxide Support | MI$_2$ | NVR |
|---|---|---|---|
| 14 | silica | 11.9 | 1.97 |
| 15 | magnesium silicate | 8.7 | 1.76 |
| 16 | aluminum silicate | 11.9 | 1.66 |

This example shows that mixtures of inorganic oxides are also useful as supports for the catalyst compositions of the invention and can, in fact, be particularly desirable supports.

The following two examples demonstrate that the reaction of the inorganic oxide with substantially less than a stoichiometric amount of the organometallic compound leads to the formation of polymers having broader molecular weight distributions when the catalyst compositions are used in polymerization reactions, and reaction with an amount of organometallic compound considerably in excess of the stoichiometric amount—although also useful in the preparation of catalyst compositions capable of being utilized in the production of injection molding-grade polymers—offers no NVR advantage over the use of a substantially stoichiometric amount of the organometallic compound.

EXAMPLE VIII

Prepare three n—$C_6H_{13}OH$/(n—$C_{18}H_{37}O$)$VOCl_2$/$Al(C_6H_{13})_3$/$SiO_2$ catalyst compositions by the catalyst preparation precedure described above, drying the silica gel at about 200° C. in each case and employing the same amounts of alcohol and vanadium compound, i.e., 1.0 mmol of n-hexanol and 0.2 mmol of n-octadecoxyvanadium oxydichloride per gram of silica, but varying the amount of tri-n-hexylaluminum used. Then use each of the catalyst compositions to prepare polyethylene by the slurry polymerization procedure described above. The yields, melt indices, and NVR values of the polymers are shown in Table VII.

TABLE VII

| Run # | mmol AlR$_3$/g SiO$_2$ | Yield | MI$_2$ | NVR |
|---|---|---|---|---|
| B | 0.8 | 45 g | 1.0 | 2.54 |
| 17 | 1.5 | 74 g | 8.3 | 1.76 |
| 18 | 2.25 | 250 g | — | 1.78 |

EXAMPLE IX

Prepare three n—C$_8$H$_{17}$OH/(n—C$_8$H$_{17}$O)VOCl$_2$/Al(C$_2$H$_5$)$_3$/SiO$_2$ catalyst compositions by the catalyst preparation procedure described above, drying the silica gel at about 550° C. in each case and employing the same amounts of alcohol and vanadium compound, i.e., 1.0 mmol of n-octanol and 0.2 mmol of n-octoxyvanadium oxydichloride per gram of silica, but varying the amount of triethylaluminum used. Then use each of the catalyst compositions to prepare polyethylene by the slurry polymerization procedure described above. The yields, melt indices, and NVR values of the polymers are shown in Table VIII.

TABLE VIII

| Run # | mmol AlR$_3$/g SiO$_2$ | Yield | MI$_2$ | NVR |
|---|---|---|---|---|
| C | 0.8 | 48 g | 4.5 | 2.58 |
| D | 0.8 | 55 g | 1.4 | 2.78 |
| 19 | 1.5 | 320 g | 20.2 | 1.95 |

EXAMPLE X

Prepare two catalyst compositions by the catalyst preparation procedure described above to test the utility of dialkoxyvanadium compounds in the practice of the invention. Use each of the compositions to prepare polyethylene by the slurry polymerization procedure described above. The yields, melt indices, and NVR values of the polymers obtained by the use of each of the catalyst compositions are shown in Table IX.

TABLE IX

| Run # | Catalyst Composition | Yield | MI$_2$ | NVR |
|---|---|---|---|---|
| 20 | C$_2$H$_5$OH/(C$_2$H$_5$O)$_2$VOCl/Al(C$_2$H$_5$)$_3$/MgO<br>1.0 mmol 0.2 mmol 1.0 mmol 1 g | 152 g | 31 | 2.07 |
| 21 | C$_6$H$_{13}$OH/(C$_{18}$H$_{37}$O)$_2$VOCl/Al(C$_6$H$_{13}$)$_3$/SiO$_2$<br>1.0 mmol 0.1 mmol 1.5 mmol 1 g | 281 g | 4.7 | 1.76 |

EXAMPLE XI

Prepare a catalyst composition by the catalyst preparation procedure described above, using silica gel as the inorganic oxide, drying it at about 200° C., and sequentially reacting with 1.5 mmol of tri-n-hexylaluminum, 0.1 mmol of vanadium oxytrichloride, and 1.0 mmol of n-hexanol per gram of silica. When the catalyst composition is used to prepare polyethylene by the slurry polymerization procedure described above, the process results in the production of 196 grams of polymer having a melt index of 12.5 and an NVR value of 1.86.

EXAMPLE XIII

Prepare three catalyst compositions by the catalyst preparation procedure described above, except for using no alcohol in the preparation of the first composition. In each case, employ SiO$_2$ as the inorganic oxide, triethylaluminum as the vanadium compound, and n-hexanol as the alcohol, when employed, and dry the support at about 250° C. Use each of the catalyst compositions to prepare polyethylene by the slurry polymerization procedure described above. The number of mmols of triethylaluminum, vanadium tetrachloride, and n-hexanol employed per gram of silica in the production of the catalyst compositions, and the yields, melt indices, and NVR values of the polymers are shown in Table X.

TABLE X

| Run # | Catalyst Composition | Yield | MI$_2$ | NVR |
|---|---|---|---|---|
| E | VCl$_4$/Al(C$_2$H$_5$)$_3$/SiO$_2$<br>0.2 1.5 | 2366 g | 0.3 | 2.34 |
| 22 | C$_6$H$_{13}$OH/VCl$_4$/Al(C$_2$H$_5$)$_3$/SiO$_2$<br>0.15 0.05 1.4 | 227 g | 1.7 | 2.17 |
| 23 | C$_6$H$_{13}$OH/VCl$_4$/Al(C$_2$H$_5$)$_3$/SiO$_2$<br>0.5 0.2 1.5 | 1007 g | 0.4 | 2.01 |

Examples X-XIII demonstrate the utility of vanadium compounds other than alkoxyvanadium oxydichlorides in the practice of the invention.

EXAMPLE XIV

Prepare a C$_6$H$_{13}$OH/(C$_{18}$H$_{37}$O)VOCl$_2$/Al(C$_6$H$_{13}$)$_3$/SiO$_2$ catalyst composition by the catalyst preparation procedure described above employing 1.5 mmol of tri-n-hexylaluminum, 0.1 mmol of n-octadecoxyvanadium oxydichloride, and 1.0 mmol of n-hexanol per gram of silica. For comparative purposes, prepare five other catalyst compositions from the same amounts of the same ingredients, and use the same drying temperature for the silica as was used in the preparation of the first of the compositions, but varying the order of addition of the catalyst components to determine the criticality of that order of addition. Then use each of the catalyst compositions to prepare polyethylene by the slurry polymerization procedure described above. The catalyst compositions and the melt indices and NVR values of the polymers are shown in Table XI, which, like the earlier Tables, lists the catalyst components in the reverse order of addition, i.e., the last-added component being the first listed as one reads from left to right.

TABLE XI

| Run # | Catalyst Composition | MI$_2$ | NVR |
|---|---|---|---|
| 24 | C$_6$H$_{13}$OH/(C$_{18}$H$_{37}$O)VOCl$_2$/Al(C$_6$H$_{13}$)$_3$/SiO$_2$ | 9.1 | 1.69 |
| F | Al(C$_6$H$_{13}$)$_3$/C$_6$H$_{13}$OH/(C$_{18}$H$_{37}$O)VOCl$_2$/SiO$_2$ | — | 2.51 |
| G | C$_6$H$_{13}$OH/Al(C$_6$H$_{13}$)$_3$/(C$_{18}$H$_{37}$O)VOCl$_2$/SiO$_2$ | — | 2.81 |
| H | (C$_{18}$H$_{37}$O)VOCl$_2$/C$_6$H$_{13}$OH/Al(C$_6$H$_{13}$)$_3$/SiO$_2$ | 0.4 | 2.44 |
| I | (C$_{18}$H$_{37}$O)VOCl$_2$Al(C$_6$H$_{13}$)$_3$/C$_6$H$_{13}$OH/SiO$_2$ | 0.2 | 2.88 |
| J | Al(C$_6$H$_{13}$)$_3$/(C$_{18}$H$_{37}$O)VOCl$_2$/C$_6$H$_{13}$OH/SiO$_2$ | 1.5 | 2.38 |

As demonstrated above, catalyst compositions prepared from the same components as the catalyst compositions of the invention do not have the same effectiveness in narrowing the molecular weight distributions of polymers prepared in their presence when the catalyst components are combined in a different order.

Each of the preceding examples illustrates the utility of catalyst compositions of the invention in slurry polymerization processes. The following two examples demonstrate their utility in gas-phase polymerization reactions.

EXAMPLE XV

Use the catalyst composition of Example I, Run #3, to prepare polyethylene by the laboratory gas-phase polymerization procedure described above. The reaction temperature employed for the polymerizations and the melt indices and NVR values of the product are shown in Table XII. There was no evidence of reactor fouling.

TABLE XII

| Run # | Temperature | MI$_2$ | NVR |
|---|---|---|---|
| 25 | 99° C. | 40 | 2.08 |
| 26 | 99° C. | 7 | 2.02 |
| 27 | 88° C. | 6 | 2.14 |
| 28 | 88° C. | 3 | 2.16 |

EXAMPLE XVI

Use the catalyst composition of Example VIII, Run #17, to prepare polyethylene by the laboratory gas-phase polymerization procedure described above. The melt indices and NVR values of the products are shown in Table XIII. There was no evidence of reactor fouling.

TABLE XIII

| Run # | MI$_2$ | NVR |
|---|---|---|
| 29 | 10.8 | 1.89 |
| 30 | 24.1 | 1.88 |
| 31 | 7.7 | 1.85 |

EXAMPLE K

An attempt was made to essentially repeat Example III of U.S. Pat. No. 4,232,140 using the laboratory gas-phase polymerization method described above with Ort's catalyst and CFCl$_3$ promoter, operating the equipment continuously 24 hours a day. After two days, and before the reaction had lined out sufficiently to get a good sample of the desired product for comparison with the products made by the catalysts of this invention, the reactor became inoperable. After the reaction system had been shut down, the reactor was opened. The reactor walls and distribution plate were found to be fouled (coated with polymer) to the extent that normal fluidization could not be maintained.

The reactor was thoroughly cleaned, and the attempt repeated. This time, the reactor "fouled out" in about one day. A third attempt to run this catalyst and CFCl$_3$ promoter on a continuous basis was similarly unsuccessful. This example shows that long term operability of a gas-phase fluidized bed depends upon proper choice of catalyst and promoter.

The foregoing examples illustrate the utility of the invention in the preparation of high density polyethylene which typically have densities of at least 0.965 g/cc. The following examples illustrate its utility in the preparation of ethylene polymers having lower densities.

EXAMPLE XVII

Prepare two catalyst compositions by the catalyst preparation procedure described above, using magnesia as the inorganic oxide in each case, drying it at about 200° C., and sequentially reacting it with 1.4 mmol of triethylaluminum, 0.2 mmol of an alkoxyvanadium oxydichloride, and 1.0 mmol of an alkanol per gram of magnesia. Then use each of the catalyst compositions to prepare an ethylene copolymer by the slurry polymerization procedure described above, employing 30 cc of liquid butene-1 as the comonomer in each case. The catalyst compositions and the melt indices, NVR values, and densities of the polymer are shown in Table XIV.

TABLE XIV

| Run # | Catalyst Composition | MI$_2$ | NVR | Density |
|---|---|---|---|---|
| 32 | C$_2$H$_5$OH/(C$_2$H$_5$O)VOCl$_2$/Al(C$_2$H$_5$)$_3$/MgO | 20 | 2.00 | 0.960 |
| 33 | C$_4$H$_9$OH/(C$_4$H$_9$O)VOCl$_2$/Al(C$_2$H$_5$)$_3$/MgO | 1.4 | 1.95 | 0.956 |

EXAMPLE XVIII

Prepare two catalyst compositions by the catalyst preparation procedure described above, using silica as the inorganic oxide in each case, drying it at about 550° C., and sequentially reacting it with 1.4 mmol of triethylaluminum, 0.2 mmol of an alkoxyvanadium oxydichloride, and 1.0 mmol of an alkanol per gram of silica. Then use each of the catalyst compositions to prepare an ethylene copolymer by the slurry polymerization procedure described above, employing 40 cc of liquid butene-1 as the comonomer in each case. The catalyst compositions and the melt indices, NVR values, and densities of the polymers are shown in Table XV.

TABLE XV

| Run # | Catalyst Composition | MI$_2$ | NVR | Density |
|---|---|---|---|---|
| 34 | C$_8$H$_{17}$OH/(C$_8$H$_{17}$O)-VOCl$_2$/Al(C$_2$H$_5$)$_3$/SiO$_2$ | 52.6 | 2.05 | 0.948 |
| 35 | CH$_3$OH/(C$_{18}$H$_{37}$O)VOCl$_2$/Al(C$_2$H$_5$)$_3$/SiO$_2$ | 17.3 | 1.85 | 0.952 |

EXAMPLE XIX

Prepare two catalyst compositions by the catalyst preparation procedure described above, using alumina as the inorganic oxide in each case, drying it at about 550° C. in the case of the catalyst composition to be used in Run #36 and at about 500° C. in the case of the catalyst composition to be used in Run #37, and sequentially reacting it with 1.5 mmol of trialkylaluminum, 0.2 mmol of n-octoxyvanadium oxydichloride, and 1.0 mmol of n-octanol per gram of alumina. Then use each of the catalyst compositions to prepare an ethylene copolymer by the slurry polymerization procedure described above, employing 40 cc of liquid butene-1 as the comonomer in each case. The catalyst compositions and the melt indices, NVR value and densities of the polymers are show in Table XVI.

TABLE XVI

| Run # | Catalyst Composition | MI$_2$ | NVR | Density |
|---|---|---|---|---|
| 36 | C$_8$H$_{17}$OH/(C$_8$H$_{17}$O)VOCl$_2$/ | 16.3 | 1.75 | 0.955 |

TABLE XVI-continued

| Run # | Catalyst Composition | MI$_2$ | NVR | Density |
|---|---|---|---|---|
| 37 | Al(C$_2$H$_5$)$_3$/Al$_2$O$_3$ C$_8$H$_{17}$OH/(C$_8$H$_{17}$O)VOCl$_2$/ Al(C$_6$H$_{13}$)$_3$/Al$_2$O$_3$ | 67.8 | 1.63 | 0.955 |

EXAMPLE XX

Use the catalyst composition of Example XIII, Run #23, to prepare an ethylene copolymer by the slurry polymerization procedure described above, employing 100 cc of liquid butene-1 as the comonomer. The process results in the production of 1007 grams of an ethylene/butene-1 copolymer having an NVR value of 2.01 and a density of 0.937.

EXAMPLE XXI

Use the catalyst of Example XI to prepare an ethylene copolymer by the slurry polymerization procedure described above, utilizing 40 cc of liquid butene-1 as the comonomer. The process results in the production of 283 grams of an ethylene/butene-1 copolymer having an MI$_2$ of 11.4 and an NVR value of 2.17.

EXAMPLE XXII

A batch of catalyst having the composition 1.4 mmol triethylaluminum, 0.2 mmol VCl$_4$, 0.5 mmol n-octanol per gram SiO$_2$ was prepared as a dry powder according to the general procedure of Rogers, U.S. Pat. No. 4,426,317. Gas phase copolymerization was carried out in a small pilot plant similar in design to the laboratory gas phase reactor except that there was no separator in the gas recycle line. The reactor had a reaction zone 30 cm in diameter, about 2 m tall. This run was conducted at 2.0 MPa and 81° degrees C. average bed temperature with a recycle gas flow of about 1100 kg/hr which gave a gas velocity in the bed of about 30 cm/sec. The recycle gas stream consisted essentially of 84.4% ethylene, 3.8% hydrogen, 9.3% butene-1, and 2.5% nitrogen. Catalyst was added with nitrogen to the fluidized bed at an average rate of 7.5 cc/hr, triethylaluminum (TEA) was added as a 10% solution in hexane at a rate of 4.9 cc/hr, and chloroform was added at a rate of 1.4 cc/hr. A film-grade polymer having a melt index of 1.4, a density of 0.934, and a total ash content of 600 ppm was produced at an average rate of about 7 kg/hr during 8 hours of steady operation.

EXAMPLE L

At the conclusion of Example XXII, the hydrogen feed is discontinued while everything else is maintained essentially unchanged. Gradually, the hydrogen/ethylene ratio drops, as determined by an on-line gas analyzer, as recycle gases are lost from the reaction zone through purge to the instruments and by being removed with the polyethylene product, with no fresh hydrogen being added to the make up gases. As the hydrogen level in the recycle gas decreases, the polymer melt index drops until it is unmeasurably low. The polymerization rate, as determined by ethylene uptake and by product removal from the reaction zone, is unchanged within experimental error. There is no external evidence of reactor fouling. Hydrogen flow is then restarted, and the original hydrogen/ethylene ratio reestablished. Within 18 hours, the melt index is again 1.4 and the polymer is again useful for film.

The chloroform feed is then discontinued, all other variables being held as constant as possible. Gradually, the CHCl$_3$/V ratio decreases as the CHCl$_3$ concentration in the recycle gas becomes lower due to loss of recycle gas from the system and the make-up gases being promoter-free. There is no significant change in the melt index of the polymer, but the polymerization rate drops and the ash content of the polymer increses to about 3000 ppm, too high for good quality film. The chloroform feed is then restarted at its original feed rate. Polymerization rate picks up immediately, as judged from an increase in both bed temperature and polymer powder production, and reaches a level of about 10 kg/hr, after which the rate slowly declines and lines out at about 7 kg/hr. About 36 hours after chloroform is readmitted to the reaction, the reaction and polymer are restablized at the original conditions and the polymer is again useful for film.

Then the triethylaluminum feed is stopped, all other variables being held as constant as possible. The polymerization rate begins to decrease, slowly at first, and then rapidly. The ash content of the polymer increases correspondingly. When the polymerization rate reaches about 1 kg/hr, the reaction is terminated intentionally, and the reactor opened for inspection. There is no visible coating or fouling on the distribution plate or reactor walls.

This example illustrates that trialkylaluminum, chloroform and hydrogen, in the proper proportions, are essential to useful practice of this invention.

EXAMPLE XXIII

The general procedure of Example XXII was repeated except that the catalyst had the formulation of the catalyst of Example XIII run 22 and propylene was the comonomer. Polymerization pressure was about 2.1 MPa, and average bed temperatures were in the range of 78–82 degrees C. The other run conditions and corresponding polymer properties obtained are given in Table XV. Each run in Table XV represents a different condition of reasonably stable, operation during a 7-day period of continuous operation. At the end of the 7-day period, the reactor was shut down by failure of the polymer withdrawal system. There was no evidence of fouling the reactor walls or the distribution plate.

TABLE XV

| Run # | 38 | 39 | 40 | 41 | 42 |
|---|---|---|---|---|---|
| Recycle gas composition: | | | | | |
| % Ethylene | 61.6 | 63.0 | 68.0 | 58.9 | 61.0 |
| % Hydrogen | 1.1 | 1.5 | 1.3 | 1.0 | 1.0 |
| % Propylene | 12.4 | 11.4 | 7.4 | 11.9 | 11.4 |
| % Nitrogen | 24.9 | 24.1 | 23.3 | 28.2 | 26.6 |
| % Chloroform | 0.007 | 0.0098 | 0.0073 | 0.012 | 0.015 |
| Flow Rates: | | | | | |
| Catalyst (cc/hr) | 5.3 | 4.6 | 2.6 | 3.3 | 3.8 |
| TEA (cc/hr) | 3.1 | 3.0 | 3.7 | 3.6 | 3.9 |
| Production (kg/hr) | 2.1 | 3.4 | 1.5 | 2.0 | 2.2 |
| Polymer properties: | | | | | |
| MI (dg/min) | 1.1 | 0.87 | 0.76 | 0.90 | 0.48 |
| Density (g/cc) | 0.916 | 0.917 | 0.920 | 0.919 | 0.915 |
| Ash, ppm | 390 | | 367 | 340 | 347 |
| V residue, ppm | 1.6 | 0.9 | 1.1 | 1.1 | 1.1 |

Example XXIV

Three samples of narrow molecular weight distribution ethylene copolymers were made in a larger gas-phase fluidized-bed pilot plant polymerization system. The reaction zone was 46 cm in diameter and about 3 m tall. It was topped by a disengaging zone of 92 cm diameter. Gas recycle piping led from the disengaging zone through a heat exchanger and recycle gas blower to the bottom of the reactor. A distribution plate at the bottom of the reactor served to disperse or distribute the gas evenly at the bottom of the bed. Gas analyzers monitored the gas composition of the recycle system and, via suitable instrumentation, automatically adjusted flows of feed streams to keep the gas composition constant. Catalyst was fed directly to the bed with an automatic catalyst feeder using nitrogen as the motive gas to convey the catalyst into the bed. Triethylaluminum (TEA) was pumped directly into the bed. Polymer powder was automatically withdrawn to maintain a constant inventory of powder in the reactor. For all three samples, reaction pressure was about 3.5 MPa, average bed temperature ws about 92 degrees C., and the recycle gas rate was about 4525 kg/hr, which gave a gas velocity in the bed of about 30 cm/sec. Average reaction conditions during the time each sample was collected and results for each sample are given in Table XVI.

Catalysts for these runs were made essentially as taught by Rogers in U.S. Pat. No. 4,426,317. For runs 43 and 44, the catalyst composition was 1.5 mmol tri-n-hexylaluminum, 0.1 mmol n-octadecyloxyvanadium oxydichloride and 1.0 mmol n-hexanol per gram of dry silica support. For run 45, the catalyst had the composition of 2.25 mmol tri-n-hexylaluminum, 0.2 mmol n-octadecyloxyvanadium oxydichloride and 1.0 mmol n-hexanol per gram of dry silica. There was no evidence of reactor fouling after any of the runs.

TABLE XVI

| Run # | 43 | 44 | 45 |
|---|---|---|---|
| Recycle Gas Composition: | | | |
| % Nitrogen | 5.6 | 5.9 | 6.8 |
| % Ethylene | 86.1 | 85.1 | 84.8 |
| % Hydrogen | 4.4 | 5.1 | 5.3 |
| % Propylene | 3.9 | 3.9 | 3.1 |
| % Chloroform | 0.070 | 0.085 | 0.080 |
| Other Polymerization data: | | | |
| Al/V ratio | 42 | 29 | 26 |
| CHCl$_3$/V ratio | 123 | 305 | 112 |
| Production (kg/hr) | 15 | 13 | 13 |
| Polymer properties: | | | |
| MI (dg/min) | 2.2 | 4.5 | 2.1 |
| Density (g/cc) | 0.953 | 0.954 | 0.954 |
| Ash, ppm | 702 | 694 | 323 |
| V residue, ppm | 2.9 | 3.1 | 2.9 |

EXAMPLE XXV

A commercial gas-phase fluidized-bed polymerization is carried out in a polymerization system of the same general description as the pilot plant of example XXIV. However, the reaction zone is 3.6 m in diameter and about 15 m tall. Recycle gas rate is sufficient to give a gas velocity in the bed of about 30 cm/sec. The polymerization is conducted at 3.5 MPa pressure and 93 degrees C. average bed temperature with a feed stream targets of 6.0 vol % nitrogen, 85.0% ethylene, 3.9% propylene, 5.1% hydrogen, and 0.07% chloroform. The catalyst hs the formulation 1.4 mmol triethylaluminum, 0.1 mmol undecyloxyvanadium oxydichloride, 1.0 mmol n-octanol and is made in commercial batches of 450 kg each. The Al/V ratio during polymerization varies slightly as monomer purity varies, but is in the range of 10 to 30.

The polymer, produced at a rate of about 8.5 metric tons per hour, is an injection molding grade, has an average melt index of 5, an average density of 0.954, and an NVR of 1.9 plus or minus 0.1 This product is made in commercial runs of two weeks or longer without evidence of reactor fouling.

Similar results in the narrowing of the molecular weight distributions of ethylene polymers are obtained when the examples are repeated except that the catalyst components, component proportions, comonomers, comonomer proportions, and/or polymerization conditions specified in the examples are replaced with catalyst components, component proportions, comonomers, comonomer proportions, and/or polymerization conditions taught to be their equivalents in the specification.

While the present invention has been described herein with reference to particular emodiments thereof, a latitude of modification, various changes and substitutions are intended in the foregoing disclosure, and it will be appreciated that in some instances some features of the invention will be employed without a corresponding use of other features without departing from the scope of the invention as set forth.

We claim:
1. A process of polymerizing a monomer charge comprising chloroform, ethylene and hydrogen comprising the steps of:
   (a) drying an inorganic oxide selected from the group consisting of silica, alumina, magnesia, and mixtures thereof, having a surface hydroxyl groups to form a support that is substantially free of adsorbed water;
   (b) reacting the surface hydroxyl groups of the support with a substantially stoichiometric amount of at least one organometallic compound corresponding the formula $R_xAlR'_yR''_z$ wherein R is an alkyl group containing 1 to 12 carbon atoms, R' and R'' are independently selected from the group consisting of H, and alkyl and alkoxy groups containing 1 to 12 carbon atoms, x has a value of 1 to 3, and y and z each can have a value of 0 to 2 and the sum of y and z is not greater than 3—x, to provide a treated support;
   (c) reacting the thus-reacted support with from between about 0.001 to about 3 mols, per mol of organometallic compound of at least one vanadium compound corresponding to a formula selected from at leat one of the formulas $(R'''O)_n VOX_{3-n}$ and $(R'''O)_m VX_{4-m}$ in which formulas R''' is a monovalent hydrocarbon radical that is free of aliphatic unsaturation having from 1 to 18 carbon atoms, X is Cl or Br, n has a value of 0 to 3, and m has a value of 0 to 4;
   (d) reacting the product of step (c) with from about 0.1 mol to about 10 mols, per mol of organometallic compound, of an alcohol containing 1 to 18 carbon atoms; and
   (e) contacting in a gas-phase reaction zone containing a trialkylaluminum, the catalyst product of step (d) with a monomer charge comprising chloroform, ethylene, and hydrogen to produce a high yield polymerized monomer having a narrow-to-intermediate molecular weight distribution.
2. The process of claim 1 additionally comprising removing particulate substantially polymerized monomer particles from the reaction zone having a narrow-to-intermediate molecular weight distribution.

3. The process of claim 1 wherein said contacting in a gas-phase reaction zone is without having washed the catalyst product.

4. The process of claim 2 additionally comprising recycling unreacted monomer charge from the top of the reaction zone to the bottom of the reaction zone.

5. The process of claim 3 additionally comprising recycling unreacted monomer charge from the top of the reaction zone to the bottom of the reaction zone.

6. A process of polymerizing a monomer charge comprising chloroform, ethylene and hydrogen comprising the steps of:
  (a) drying an inorganic oxide selected from the group consisting of silica, alumina, magnesia and mixtures thereof, having a surface hydroxyl groups to form a support that is substantially free of absorbed water;
  (b) reacting the surface hydroxyl groups of the support with a substantially stoichiometric amount of at least one organometallic compound corresponding to the formula $R_xAlR'_yR''_z$ wherein R is an alkyl group containing 1 to 12 carbon atoms, R' and R'' are independently selected from the group consisting of H, and alkyl and alkoxy groups containing 1 to 12 carbon atoms, x has a value of 1 to 3, and y and z each can have a value of 0 to 2 and the sum of y and z is not greater than $3-x$, to provide a treated support;
  (c) reacting the thus-treated support with from between about 0.001 mol to about 3 mols, per mol or organometallic compound, of at leat one vanadium compound corresponding to a formula selected from at least one of the formulas $(R'''O)_n VOX_{3-n}$ and $(R'''O)_m VX_{4-m}$ in which formulas R''' is a monovalent hydrocarbon radical that is free of aliphatic unsaturation having from 1 to 18 carbon atoms, X is Cl or Br, n has a value of 0 to 3, and m has a value of 0 to 4;
  (d) reacting the product of step (c) with from about 0.1 mol to about 10 mols, per mol of organometallic compound, of an alcohol containing 1 to 18 carbon atoms; and
  (e) contacting in a gas-phase reaction zone containing a trialkylaluminum, without washing the catalyst product of step (d), the catalyst product with said monomer charge comprising chloroform, ethylene, and hydrogen to produce a high yield polymerized monomer having a narrow-to-intermediate molecular weight distribution.

7. The process of claim 6 additionally comprising removing particulate substantially polymerized monomer particles from the reaction zone having a narrow-to-intermediate molecular weight distribution.

8. The process of claim 7 additionally comprising recycling unreacted monomer charge from the top of the reaction zone to the bottom of the reaction zone.

9. The process of claim 1 or 6 wherein said inorganic oxide is dried at from about 100° C. to 1000° C. until substantially all adsorbed water is removed.

10. The process of claim 9 wherein the inorganic oxide is alumina, and said drying temperature for said alumina is from about 400° C. to about 600° C. in order to narrow the molecular weight distribution of said polymerized monomer.

11. The process of claim 1 or 6 wherein the organometallic compound is a trialkylaluminum.

12. The process of claim 11 wherein the trialkylaluminum is triethylaluminum.

13. The process of claim 11 wherein trialkylaluminum is tri-n-hexylaluminum.

14. The process of claim 1 to 6 wherein the vanadium compound is a compound corresponding to the formula $(R'''O)_n VOCl_{3-n}$.

15. The process of claim 14 wherein n has a value of 0.

16. The process of claim 1 to 6 wherein the vanadium compound is a compound corresponding to the formula $(R'''O)_m VCl_{4-m}$.

17. The process of claim 16 wherein m has a value of 0.

18. The process of claim 1 or 6 wherein the alcohol is a primary alcohol.

19. The process of claim 18 wherein the alcohol is an alkanol containing at least 6 carbon atoms.

20. The process of claim 1 to 6 wherein the amounts of materials employed are such as to provide, as starting materials, about 5 to 30 mols of organometallic compound per mol of vanadium compound.

21. The process of claim 14 wherein R''' is alkyl and n has a value of about 1.

22. The process of claim 1 or 6 wherein the amount of organometallic compound reacted with the surface hydroxyl groups of the support is the substantially stoichiometric amount.

23. A process of polymerizing a monomer charge comprising chloroform, ethylene and hydrogen comprising the steps of:
  (a) drying at between 100° C. to 1000° C. a silica support having surface hydroxyl groups to form a support that is substantially free of adsorbed water;
  (b) reacting the surface hydroxyl groups of the support with a substantially stoichiometric amount of triethylaluminum per gram of silica support, to provide a treated support;
  (c) reacting the thus-treated support with from about 0.001 mol to about 3 mols, per mol of triethylaluminum compound, of $VCl_4$;
  (d) reacting the product of step (c) with from about 0.1 mol to about 10 mols, per mol of triethylaluminum, of n-hexanol;
  (e) contacting in a gas-phase reaction zone containing a trialkylaluminum, without washing the catalyst product of step (d), the catalyst product with a monomer charge comprising chloroform, ethylene, and hydrogen to produce a high yield polymerized monomer having a narrow-to-intermediate molecular weight distribution without fouling the gas-phase reaction zone.

24. The process of claim 1, 6 or 23 wherein said monomer charge additionally comprises at least one alpha-olefin containing 3 to 8 carbon atoms.

25. The process of claim 23 additionally comprising removing particulate substantially polymerized monomer particles from the reaction zone having a narrow-to-intermediate molecular weight distribution.

26. The process of claim 25 additionally comprising recycling unreacted monomer charge from the top of the reaction zone to the bottom of the reaction zone.

27. A process of polymerizing a monomer charge comprising chloroform, ethylene, and hydrogen in a gas-phase, fluidized-bed, reaction zone which comprises a bed of particulate substantially polymerized ethylene particles and is under operating conditions for polymerizing ethylene using the monomer charge, said process comprising the steps of:

(a) drying at from about 100° to about 1000° C. an inorganic oxide selected from the group consisting of silica, alumina, magnesia, and mixtures thereof, having surface hydroxyl groups to form a support that is substantially free of adsorbed water;
(b) cooling the dried inorganic oxide of step (a) to ambient temperature;
(c) reacting the surface hydroxyl groups of the support with a substantially stoichiometric amount of at least one organometallic compound corresponding to the formula RAlR'R" wherein at least one of the R, R', and R" substitutents is an alkyl group containing 1 to 12 carbon atoms and the remaining substituents are independently selected from the group consisting of hydrogen and alkyl and alkoxy groups containing 1 to 12 carbon atoms, to provide a treated support;
(d) reacting the thus-treated support with from about 0.001 mol to about 3 mols, per mol of RalR'R" compound, of at least one vanadium compound corresponding to a formula selected from at least one of the formulas $(R'''O)_n VOCl_{3-n}$ and $(R'''O)_m VCl_{4-m}$ in which formula $R'''$ is a monovalent hydrocarbon radical that is free of aliphatic unsaturation having from 1 to 18 carbon atoms, n has a value of 0 to 3, and m has a value of 0 to 4;
(e) reacting the product of step (d) with at least about 0.1 mol to about 10 mols, per mol of RAlR'R" compound, of an alcohol containing 1 to 18 carbon atoms;
(f) drying the product of step (e);
(g) feeding the product of step (f) into a gas-phase reaction zone in order to form part of the bed in the fluidized-bed reaction zone;
(h) feeding, separately and independently of said feeding step (g), into the gas-phase reaction zone a triethylaluminum such that such bed in the gas-phase reaction zone comprises the product of step (e), triethylaluminum, and particulate substantially polymerized ethylene particles;
(i) fluidizing the bed of step (h) at a temperature of from about 50° C. to about 120° C. by introducing into the reaction zone a gas mixture comprising ethylene, hydrogen, and chloroform;
(j) removing particulate substantially polymerized ethylene particles from the reaction zone having a narrow-to-intermediate molecular weight distribution; and
(k) recycling unreacted gas mixture of step (i) from the top of the reaction zone, through a heat exchanger means, and into the bottom of the reaction zone.

28. A process of polymerizing a monomer charge comprising an alpha olefin, chloroform, ethylene, and hydrogen in a gas-phase, fluidized-bed, reaction zone which comprises a bed of particulate substantially polymerized ethylene particles and is under operating conditions for polymerizing ethylene using the monomer charge, said process comprising the steps of:
(a) drying at from about 100° to about 1000° C. an inorganic oxide selected from the group consisting of silica, alumina, magnesia, and mixture thereof, having surface hydroxyl groups to form a support that is substantially free of adsorbed water;
(b) cooling the dried inorganic oxide of step (a) to ambient temperature;
(c) reacting the surface hydroxyl groups of the support with a substantially stoichiometric amount of at least organometallic compound corresponding to the formula RAlR'R" wherein at least one of the R, R', and R" substitutents is an alkyl group containing 1 to 12 carbon atoms and the remaining substituents are independently selected from the group consisting of hydrogen and alkyl and alkoxy groups containing 1 to 12 carbon atoms, to provide a treated support;
(d) reacting the thus-treated support with from about 0.001 mol to about 3 mols, per mol of RAlR'R" compound, of at least one vanadium compound corresponding to a formula selected from at least one of the formulas $(R'''O)_n VOCl_{3-n}$ and $(R'''O)_m VCl_{4-m}$ in which formula $R'''$ is a monovalent hydrocarbon radical that is free of aliphatic unsaturation having from 1 to 18 carbon atoms, n has a value of 0 to 3, and m has a value of 0 to 4;
(e) reacting the product of step (D) with at least about 0.1 mol to about 10 mols, per mol of RAlR'R" compound, of an alcohol containing 1 to 18 carbon atoms;
(f) drying the product of step (e);
(g) feeding the product of step (f) into a gas-phase reaction zone in order to form part of the bed in the fluidized-bed reaction zone;
(h) feeding, separately and independently of said feeding step (g), into the gas-phase reaction zone a triethylaluminum such that such bed in the gas-phase reaction zone comprises the product of step (e), the triethylaluminum, and particulate substantially polymerized ethylene particles;
(i) fluidizing the bed of step (h) at a temperature of from about 50° C. to about 120° C. by introducing into the reaction zone a gas mixture comprising an alpha olefin, ethylene, hydrogen, and chloroform;
(j) removing particulate substantially polymerized ethylene particles from the reaction zone having a narrow-to-intermediate molecular weight distribution; and
(k) recycling unreacted gas mixture of step (i) from the top of the reaction zone, through a heat exchanger means, and into the bottom of the reaction zone.

* * * * *